United States Patent
Vanotti et al.

(10) Patent No.: US 6,893,567 B1
(45) Date of Patent: May 17, 2005

(54) WASTEWATER TREATMENT SYSTEM

(75) Inventors: Matias B. Vanotti, Florence, SC (US); Ariel A. Szogi, Florence, SC (US); Patrick G. Hunt, Florence, SC (US)

(73) Assignees: The United States of America as represented by the Secretary of Agriculture, Washington, DC (US); North Carolina State University, Raleigh, NC (US)

( * ) Notice: Subject to any disclaimer, the term of this patent is extended or adjusted under 35 U.S.C. 154(b) by 533 days.

(21) Appl. No.: 09/903,620

(22) Filed: Jul. 13, 2001

(51) Int. Cl.$^7$ ................................................. C02F 3/00
(52) U.S. Cl. ..................... 210/605; 210/620; 210/631; 210/723; 210/724; 210/906; 210/220; 210/532.1
(58) Field of Search ................ 210/605, 620, 210/631, 723, 724, 906, 220, 532.1

(56) References Cited

U.S. PATENT DOCUMENTS

| | | | |
|---|---|---|---|
| 3,964,998 A | * | 6/1976 | Barnard ...................... 210/605 |
| 4,017,388 A | * | 4/1977 | Albertson ................... 210/713 |
| 4,431,543 A | * | 2/1984 | Matsuo et al. .............. 210/605 |
| 4,780,208 A | * | 10/1988 | Bohnke et al. ............. 210/605 |
| 5,228,997 A | | 7/1993 | Martin et al. |
| 5,268,105 A | * | 12/1993 | Uejima et al. .............. 210/663 |
| 5,622,697 A | * | 4/1997 | Moore, Jr. ................. 424/76.6 |
| 5,753,109 A | * | 5/1998 | Looney et al. ............. 210/149 |
| 5,759,401 A | * | 6/1998 | Boussely et al. ........... 210/605 |
| 5,811,009 A | * | 9/1998 | Kos ........................... 210/605 |
| 6,039,874 A | | 3/2000 | Teran et al. |
| 6,113,788 A | | 9/2000 | Molof et al. |
| 6,117,323 A | | 9/2000 | Haggerty |
| 6,136,185 A | | 10/2000 | Sheaffer |
| 6,139,743 A | | 10/2000 | Park et al. |
| 6,153,094 A | | 11/2000 | Jowett et al. |
| 6,163,932 A | | 12/2000 | Rosen |
| 6,177,007 B1 | | 1/2001 | Lee et al. |
| 6,183,643 B1 | | 2/2001 | Goodley |
| 6,200,469 B1 | | 3/2001 | Wallace |
| 6,207,059 B1 | | 3/2001 | Moore, III |
| 6,245,121 B1 | | 6/2001 | Lamy et al. |

OTHER PUBLICATIONS

Szoji, A.A., et al., "Treatment of Swine Wastewater by Constructed Wetlands", *Clean Water–Clean Environment—21st Century Conference Proceedings*, vol. II: Nutrients, pp. 227–230, Kansas City, Missouri, Mar. 5–8, 1995.

Hunt, P.G., et al., "Swine Wastewater Treatment in Constructed Wetlands", *Environmentally Sound Agriculture, Proceedings of the Second Conference*, Apr. 20–22, 1994, Orlando, FL.Am. Soc. Agric. Rng., St. Joseph, MI, pp. 268–275.

Hunt, P.G., et al., "Constructed Wetland Treatment of Swine Wastewater", Written for Presentation at the 1993 International Winter Meeting Sponsored by ASAE, pp. 1–12, Chicago, IL, Dec. 12–17, 1993.

(Continued)

*Primary Examiner*—Chester T. Barry
(74) *Attorney, Agent, or Firm*—John D. Fado; Gail E. Poulos

(57) ABSTRACT

Wastewater treatment systems and processes for: removal of solids, pathogens, nitrogen, and phosphorus from municipal and agricultural wastewater include nitrification of wastewater and increasing the pH of the nitrified wastewater by adding a metallic-containing salt and hydroxide to precipitate phosphorus to form a useable effluent having a specified nitrogen:phosphorus ratio that is useful as a fertilizer or spray for remediation of contaminated soils. The presence of infectious microorganism such as enteropathogenic bacteria and picarnoviruses will be reduced in the useable effluent. The precipitated phosphorus is recovered and used to form useable phosphorus products.

25 Claims, 11 Drawing Sheets

OTHER PUBLICATIONS

Wastewater Treatment, *Seventh International Symposium on Agricultural and Food Processing Wastes (ISAFPW95)*, pp. 87–97, Chicago, Illinois, Jun. 18–20, 1995.

Vanotti, M.B., et al., "Solids and Nutrient Removal from Flushed Swine Manure Using Polyacrylamides", *Transactions of the ASAE*, vol. 42, (6), pp. 1833–1840, 1999.

Cook, M.G., et al., "Reducing Diffuse Pollution through Implementation of Agricultural Best Management Practices: A Case Study", *Wat. Sci. Tech.*, vol. 33, (4–5), pp. 191–196, 1996.

Vanotti, M.B., et al., "Nitrifying High–strength Wastewater", *Industrial Wastewater*, pp. 30–36, Sep./Oct. 2000.

Vanotti, M.B., et al., "Nitrification Treatment of Swine Wastewater with Acclimated Nitrifying Sludge Immobilized in Polymer Pellets", *Transactions of the ASAE*, vol. 43, (2), pp. 405–413, 2000.

Vanotti, M.B., et al., "Nitrification of Swine Wastewater Using Bacteria Encapsulated in Polymer Pellets", Proceedings of the 1999 Animal Waste Management Symposium, Cary, NC, Jan. 27–28, 1999.

Hunt, P.G., et al., "State of the Art for Animal Wastewater Treatment in Constructed Wetlands", pp. 53–63.

Vanotti, M.B., et al., "Advanced Treatment System for Liquid Swine Manure Using Solid–Liquid Separation and Nutrient Removal Unit Processes", Animal, *Agricultural and Food Processing Wastes*, Proceeding of the Eighth International Symposium, pp. 393–400, Des Moines, Iowa, Oct. 9–11, 2000.

Manthey, T.A., et al., "Denitrification in a Restored Riparian Zone Adjacent to a Swine Wastewater Spray Field", *Soil Science Divisions*, p. 296, Division S–6.

Hunt, P.G., et al., "Denitrification in Constructed Wetlands for Swine Wastewater Treatment", *Soil Science Divisions*, p. 329, Division S–10.

Szogi, A.A., et al., "Distribution of Dissolved Nutrients in the Soil and Water Column of a Constructed Wetland for Swine Wastewater Treatment", *Soil Science Divisions*, p. 330, Division S–10.

Edwards, D.R., et al., "Environmental Impacts of On–Farm Poultry Waste Disposal—A Review", Bioresource Technology, vol. 41, pp. 9–33, 1992.

Westerman, P.W., et al., "Tangential Flow Separation and Chemical Enhancement to Recover Swine Manure Solids and Phosphorus", *ASAE Meeting Presentation*, pp. 1–25, Orlando, Florida, Jul. 12–16, 1998.

Heathwaite, L., et al., "A Conceptual Approach for Integrating Phosphorus and Nitrogen Management at Watershed Scales", *J. Environ. Qual.*, vol. 29, pp. 158–166, 2000.

Sharpley, A., et al., "Practical and Innovative Measures for the Control of Agricultural Phosphorus Losses to Water: An Overview", *J. Environ. Qual.*, vol. 29, (1), pp. 1–9, 2000.

Scott, P.H., et al., "Experimental Studies for Improved Nitrification in Shallow Lagoon Systems", *Wat. Sci. Tech.*, vol. 29, (4), pp. 305–308, 1994.

Loehr, R.C., et al., "Development and Demonstration of Nutrient Removal from Animal Wastes", *EPA Report Collection*, Report No. EPA–R2–73–095, pp. 1–60, Jan. 1973.

Warrick, J., et al., "New Studies Show that Lagoons are Leaving Groundwater, Rivers Affected by waste", *The News and Observer*, Sunday, Feb. 19–26, 1995.

Cochran, K., et al., "An Economic Analysis of Alternative Hog Waste Management Technologies", *Dollars and Sense*, pp. 1–75, Environmental Defense, Washington, D.C., 2000.

Federal Register, Environmental Protection Agency, Part 2, Proposed Rules, vol. 66, (9), pp. 2960–3145, Jan. 12, 2001.

* cited by examiner

EFFECT OF ALKALI ADDITION ON pH OF SWINE WASTEWATER THAT RECEIVED NITRIFICATION PRETREATMENT VS. CONTROL

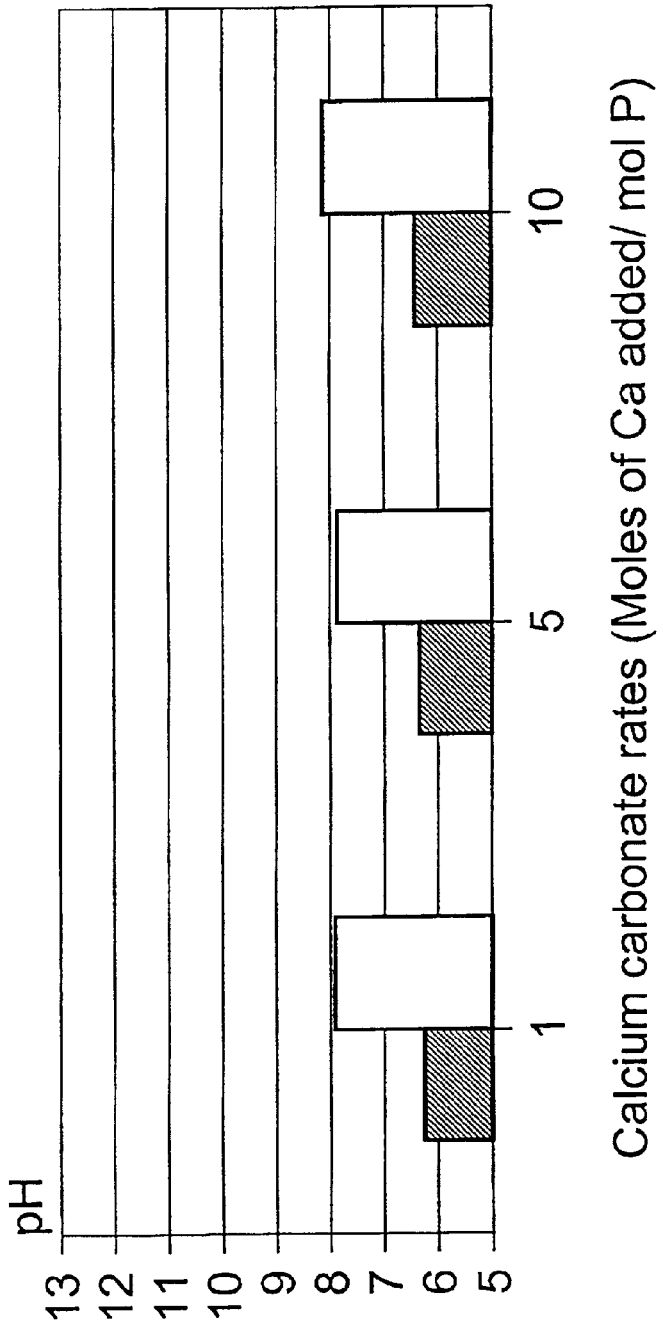

WASTEWATER TREATMENT SYSTEM

BACKGROUND OF THE INVENTION

1. Field of the Invention

This invention relates to a system and method for removal of solids, pathogens, nitrogen, and phosphorus from municipal and agricultural wastewater.

2. Description of the Related Art

Municipal and agricultural waste disposal is a major problem. For agricultural animals, the animals are confined in high densities and lack functional and sustainable treatment systems. The liquid wastes are generally treated in large anaerobic lagoons with intermittent disposal through land applications (Stith, P. and Warrick, J., Boss Hog: North Carolina's pork revolution, The News & Observer, 1–3, Feb. 19–26, 1995; USEPA, Proposed regulations to address water pollution from concentrated animal feeding operations, EPA 833-F-00-016, Januray. 2001, Office of Water, Washington, D.C. 20460). This system was developed in the early and mid 20$^{th}$ century prior to the current trend in high concentrated livestock operations. One of the main, problems in sustainability is the imbalance of nitrogen (N) and phosphorus (P) applied to land (USEPA, supra; Cochran et al., Dollars and Sense: An economic analysis of alternative hog waste management technologies, Environmental Defense, Washington, D.C., 2000). Nutrients in manure are not present in the same proportion needed by crops, and when manure is applied based on a crop's nitrogen requirement excessive phosphorus is applied resulting in phosphorus accumulation in soil, phosphorus runoff, and eutrophication of surface waters (Heathwaite et al., A conceptual approach for integrating phosphorus and nitrogen management at watershed scales, J. Environ. Qual., Volume 29, 158–166, 2000; Sharpley et al., Practical and innovative measures for the control of agricultural phosphorus losses to water: An overview, J. Environ. Qual, Volume 29, 1–9, 2000; Edwards and Daniel, Environmental Impacts of On-Farm Poultry Waste Disposal-A Review, Bioresource Technology, Volume 41, 9–33, 1992).

The change from small individual animal production operations to large, confined, commercial enterprises has caused many problems for the animal production industry including emission of ammonia ($NH_3$) from lagoons. It may be anticipated that about 50–80% of the nitrogen (N) entering animal lagoons will escape to the atmosphere through $NH_3$ volatization (Miner and Hazen, Transportation and application of organic wastes to land, In: Soils for Management of organic Wastes and Waste Waters, 379–425, eds. L. F. Elliot and F. J. Stevenson, Madison Wis.: ASA/CSSA/SSSA; Barrington and Moreno, Swine manure nitrogen conservation using Sphagnum moss, J. Environ. Quality, Volume 24, 603–607, 1995; Braum et al., Nitrogen losses from a liquid dairy manure management system, In: Agron. Abstracts, Madison, Wis.: ASA, 1997). Biological removal of nitrogen through the process of nitrification and denitrification is regarded as the most efficient and economically feasible method available for removal of nitrogen from wastewaters. The effectiveness of the biological nitrogen removal process depends on the ability of nitrifying organisms to oxidize ammonium ions ($NH_4^+$) to nitrite ($NO_2^-$) and nitrate ($NO_3^-$). Subsequent reduction to molecular nitrogen, denitrification, may be essential as well if one desires to reduce total nitrogen as well as ammonia nitrogen. This step is rapid with available carbonaceous substrate and an anaerobic environment, conditions which are typically found in farm settings in constructed wetlands or liquid manure storage units. The reaction rate of nitrification is extremely low compared to that of denitrification, so that nitrification normally will be a rate limiting step in the biological nitrogen removal process (Vanotti and Hunt, Transactions of the ASAE, Volume 43(2), 405–413, 2000).

The basic problem related to nitrification in wastewaters with a high content of organic carbon is the low growth rate of the nitrifying bacteria; the generation time of these microorganisms is about 15 hours. Compared to heterotrophic microorganisms, which have generation times of 20 to 40 minutes, the nitrifiers compete poorly for limited oxygen and nutrients and tend to be overgrown or washed out of reactors (Figueroa and Silverstein, Water Environ. Res., Volume 64(5), 728–733,1992; Wijffels et al., Possibilities of nitrification with immobilized cells in wastewater treatment Model or practical systems, Wat. Sci. Tech., Volume 27(5–6), 233–240, 1993). The nitrification of lagoon swine wastewater is an especially difficult process because of the very low numbers of Nitrosomonas and Nitrobacter usually found after anaerobic treatment (Blouin et al., Nitrification of swine waste, Canadian J. Microbiol., Volume 36, 273–278,1990). Even when the oxygen supply is plentiful, an adaptation period is needed to reach a minimum bacteria concentration for effective nitrification. Recycling surplus activated sludge in an aerobic reactor or long hydraulic retention time (HRT) is required to retain slow growing autotrophic nitrifiers. Unfortunately, in the absence of enriched nitrifying populations, aerobic treatment of lagoons can potentially add to problems by stripping ammonia into the atmosphere, particularly if uncontrolled or excessive flow rates of air are used (Burton, A review of the strategies in the aerobic treatment of pig slurry: Purpose, theory, and method, J. Agric. Eng. Res., Volume 53, 249–272, 1992).

The efficiency of the nitrification process can be increased by increasing the nitrifiers' retention time independent from the wastewater retention time (Wijffels et al, 1992; supra). In most cases, this is done by immobilization of nitrifiers. One advantage of this technology is that increased wastewater flow is possible with minimal washout of immobilized bacteria. Immobilization has been widely used in wastewater treatment applications by taking advantage of spontaneous attachment of cells to the surface of inert support materials. Applications of attached growth for treatment of swine wastewater have been developed by Ciaccolini et al. (Tests for nitrification of effluents from anaerobic digestion of swine wastes, with recovery of fertilizers for agricultural use, Acqua-Aria, Volume 2, 145–154, 1984) and St.-Arnaud et al. (Microbiological aspects of ammonia oxidation of swine waste, Canadian J. Microbiol, Volume 37, 918–923, 1991) who reported higher nitrification rates compared to systems where microorganisms were in suspension.

Managing agricultural sources of phosphorus and nitrogen at the watershed scale in order to reduce their impact on water quality requires a balanced and holistic approach (Heathwaite et al., J. Environ. Qual., Volume 29, 158–166, 2000). In the past, most emphasis has been placed on nitrogen management to ameliorate nitrate losses to ground water. While the high solubility and mobility of nitrate within agricultural systems may justify this emphasis, such bias ignores other critical elements, notably phosphorus.

Advances in biotechnology using immobilization technology have shown that higher nitrification efficiencies are possible through the entrapment of cells in polymer gels, a common technique in drug manufacturing and food processing. The successful application for nitrification treatment of municipal wastewater has been demonstrated using both natural polymers such as calcium alginate (Lewandowski et al., Nitrification and autotrophic denitrification in calcium alginate beads, Wat. Sci. Tech., Volume 19, 175–182, 1987) and synthetic polymers such as polyvinyl alcohol, PVA (Furukawa et al., Preparation of marine nitrifying sludge, J. Ferment. Bioeng., Volume 77(4), 413–418, 1994). Pellets made of synthetic polymers are superior to natural polymers in terms of strength and durability; their estimated life span is about 10 years. These characteristics are very important in long-term biotreatment operations. For this reason, synthetic polymer pellets are preferred for pilot- and plant-scale purposes. There are currently several full-scale municipal wastewater treatment plants using this technology in Japan (Takeshima et al., Pegasus: An innovative high-rate BOD and nitrogen removal process for municipal wastewater, IN: Proc. 66$^{th}$ Annual Water Environment Federation Conf., 173–181, Anaheim, Calif.:WEF, 1993). The nitrifiers are entrapped in 3- to 5-mm polymer pellets permeable to $NH_4^+$, oxygen, and carbon dioxide needed by these microorganisms, resulting in a fast and efficient removal of nitrogen. Tanaka et al. (Kinetics of nitrification using fluidized bed reactor with attached growth, Biotechnol. Bioeng., Volume 23, 1686–1702, 1981) reported nitrification rates three times higher than those of the conventional activated sludge process. Previous work with nitrifying pellets has been done exclusively in municipal-type systems where typical $NH_4^+$ concentrations are about 30 mg N $L^{-1}$ and $BOD_5 < 90$ mg $L^{-1}$.

Phosphorus inputs accelerate eutrophication when it runs off into fresh water and has been identified as a major cause of impaired water quality (Sharpley et al., 2000, supra). Eutrophication restricts water use for fisheries, recreation, industry, and drinking due to the increased growth of undesirable algae and aquatic weeds and resulting oxygen shortages caused by their death and decomposition. Also many drinking water supplies throughout the world experience periodic massive surface blooms of cyanobacteria. These blooms contribute to a wide range of water-related problems including summer fish kills, unpalatability of drinking water, and formation of trihalomethane during water chlorination. Consumption of cyanobacteria blooms or water-soluble neuro- and hepatoxins released when these blooms die can kill livestock and may pose a serious health hazard to humans. Recent outbreaks of the dinoflagellate *Pfiesteria piscicida* in near-shore waters of the eastern United States also may be influenced by nutrient enrichment. Although the direct cause of these outbreaks is unclear, the scientific consensus is that excessive nutrient loading helps create an environment rich in microbial prey and organic matter that Pfiesteria and menhaden (target fish) use as a food supply. In the long-term, decreases in nutrient loading will reduce eutrophication and will likely lower the risk of toxic outbreaks of Pfiesteria-like dinoflagellates and other harmful algal blooms. These outbreaks and awareness of eutrophication have increased the need for solutions to phosphorus run-off.

Past research efforts on phosphorus removal from wastewater using chemical precipitation have been frustrating due to the large chemical demand and limited value of by-products such as alum sludge, or because of the large chemical demand and huge losses of ammonia at the high pH that is required to precipitate phosphorus with calcium (Ca) and magnesium (Mg) salts (Westerman and Bicudo, Tangential flow separation and chemical enhancement to recover swine manure solids and phosphorus, ASAE Paper No.98-4114, St. Joseph, Mich.: ASAE, 1998); Loehr et al., Development and demonstration of nutrient removal from animal wastes, Environmental Protection Technology Series, Report EPA-R2-73-095, Washington, D.C.: EPA, 1973). Other methods used for phosphorus removal include flocculation and sedimentation of solids using polymer addition, ozonation, mixing, aeration, and filtration (See U.S. Pat. No. 6,193,889 to Teran et al). U.S. Pat. No. 6,153,094 to Craig et al. teaches the addition of calcium carbonate in the form of crushed limestone to form calcium phosphate mineral. The patent also teaches adsorbing phosphorus onto iron oxy-hydroxides under acidic conditions.

Continuing efforts are being made to improve agricultural, animal, and municipal waste treatment methods and apparatus. U.S. Pat. No. 5,472,472 and U.S. Pat. No. 5,078,882 (Northrup) disclose a process for the transformation of animal waste wherein solids are precipitated in a solids reactor, the treated slurry is aerobically and anaerobically treated to form an active biomass. The aqueous slurry containing bioconverted phosphorus is passed into a polishing ecoreactor zone wherein at least a portion of the slurry is converted to a beneficial humus material. In operation the system requires numerous chemical feeds and a series of wetland cells comprising microorganisms, animals, and plants. See also U.S. Pat. Nos. 4,348,285 and 4,432,869 (Groeneweg et al); U.S. Pat. No. 5,627,069 to Powlen; U.S. Pat. No. 5,135,659 to Wartanessian; and U.S. Pat. No. 5,200,082 to Olsen et al (relating to pesticide residues); U.S. Pat. No. 5,470,476 to Taboga; and U.S. Pat. No. 5,545,560 to Chang.

U.S. Pat. No. 6,177,077 (Lee et al.) and U.S. Pat. No. 6,200,469 (Wallace) both relate to the removal of nitrogen and phosphorus from wastewater wherein the phosphate is removed using microorganism in aerobic tanks which absorb the phosphorus released from denitrified wastewater. See also U.S. Pat. No. 6,113,788 to Molof et al., U.S. Pat. No. 6,117,323 to Haggerty; U.S. Pat. No. 6,139,743 to Park et al.

There is concern about the introduction and spread of diseases through wastewater. For example, there is great concern about the spread of Foot and Mouth Disease in countries throughout the world. Major programs are in place at present in countries free of Foot and Mouth Disease to prevent the introduction or spread of the disease. The Irish Agriculture and Food Development Authority (Teagasc) implemented a 12-point Foot and Mouth Disease protection plan including restrictions in liquid manure spreading on fields allowing only emergency spreading when manure storage tanks are likely to overflow. If the disease is introduced, it could be spread as an aerosol during liquid manure spreading. The virus can persist in aerosol form for long periods. It is estimated that sufficient virus to initiate infection can be windborne as far as 100 km (Blood, D.C., Radostits, O. M., and Henderson, J. A., Veterinary Medicine, $6^{th}$ addition, pages 733–737, 1983. Bailliere Tindall, London, U.K.). The virus is resistant to common disinfectants and the usual storage practices. But it is particularly susceptible to changes in pH away from neutral, or to heat treatment using autoclaving under pressure. Liquid swine manure normally has a pH of about 6 to 8, and the Foot and Mouth Disease virus can survive in this pH range. A shift in the pH in either direction below 5 and above 9 makes conditions for survival less favorable. Thus, infectivity of the Foot and Mouth Disease virus may be effectively destroyed by chemicals such as acids and alkalis (Callis, J., and Gregg, D., Foot-and-mouth disease in cattle, pages 437–439, 1986. In J. L. Howard (ed.), Current Veterinary Therapy 3. W. B. Saunders Company. Philadelphia, Pa.). Unfortunately, liquid swine manure contains inherent buffers, mainly carbonates and ammonia, that prevent changes in pH except when large amounts of chemicals are used. In addition to the large chemical need, addition of acid to liquid manure gives a sudden release of hydrogen sulfide and risk of gas poisoning. On the other hand, increase of pH 9 with the addition of alkali chemicals such as calcium hydroxide (lime) or sodium hydroxide is prevented by ammonia equilibrium. This means that the alkali is used to convert ammonia into gas form before effective increase of pH above 9 is achieved. Ammonia volatilization from animal facilities is an environmental problem in and of itself.

While various systems have been developed for treating wastewater for the removal of solids, pathogens, nitrogen, and phosphorus; there still remains a need in the art for a more effective wastewater treatment system. The present invention, different from prior art systems, provides a system which requires minimal chemical addition and at least reduces problems of ammonia emissions during separation of phosphorus from the aqueous phase, and recovers phosphorus in a reusable form. The process also enables precision control of the nitrogen:phosphorus ratio of the treated waste to desired levels to solve problems of phosphorus accumulation in soil or remediation of contaminated spray fields.

SUMMARY OF THE INVENTION

It is therefore an object of the present invention to provide a system for treating wastewater where a specific nitrogen:phosphorus ratio of the effluent can be achieved by selectively precipitating phosphorus in a wastewater with reduced levels of carbon and ammonium buffers.

Another object of the present invention to provide a system for selectively precipitating phosphorus in a wastewater with reduced levels of carbon and ammonium buffers using an alkaline earth metal.

A still further object of the present invention is to provide a system for treating wastewater which reduces the presence of infectious microorganisms by at least one log by increasing the pH of wastewater having reduced levels of carbon and ammonium buffers.

Another object of the present invention is to provide a process for treating wastewater where a specific nitrogen-:phosphorus ratio of the effluent can be achieved by selectively precipitating phosphorus in a wastewater with reduced levels of carbon and ammonium buffers.

A further object of the present invention is to provide a process for treating wastewater which reduces the presence of infectious microorganisms by at least one log by increasing the pH of wastewater having reduced levels of carbon and ammonium buffers.

A still further object of the present invention is to provide a system for treating wastewater which requires minimum chemical addition to precipitate phosphorus and at least reduces the problems of ammonia emissions and recovers phosphorus in a useable form.

Another object of the present invention is to provide a process for treating wastewater that requires minimum chemical addition and at least reduces problems of ammonia emissions and recovers phosphorus in a useable form.

Further objects and advantages of the invention will become apparent from the following description.

BRIEF DESCRIPTION OF THE DRAWINGS

FIG. 11 is a graph showing application of carbonate lime to swine wastewater and its effects on pH and phosphorus removal.

DETAILED DESCRIPTION OF THE INVENTION

Figure 1:
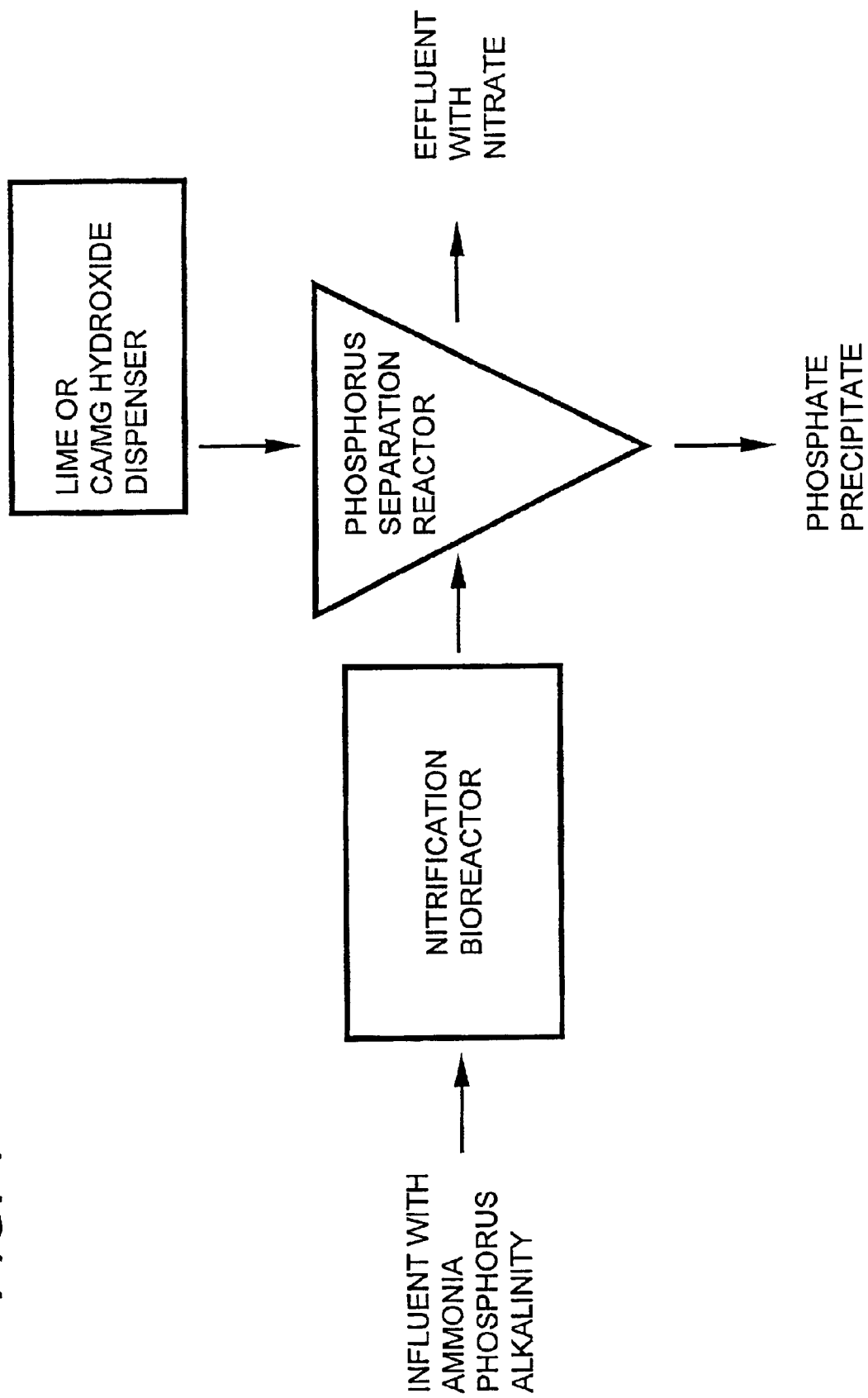
FIG. 1 is a schematic drawing showing the steps of the process of contaminant removal from wastewater.

The present invention is a system for treating wastewater to at least reduce the amount of ammonia and phosphorus, as well as least reduce the presence of infectious microorganisms. For purposes of the present invention, infectious microorganisms include bacteria, viruses, algae, fungi, protozoa, etc. Soluble phosphorus in wastewater is precipitated and removed from wastewater in a form that can be transported and marketed as a fertilizer product. Furthermore, there is described a process for the removal of phosphorus from animal waste that requires minimum chemical addition and at least reduces problems of ammonia emissions and recovers phosphorus in a reusable form. The process further at least reduces the presence of bacteria and viruses, such as for example, enteropathogenic bacteria, picornaviruses, such as for example, Foot and Mouth Disease virus, etc. The present invention will reduce the presence of infectious microorganisms by at least one log which is approximately a 90% reduction up to a least about 4 logs which is approximately a 99.99% reduction of microorganisms.

It has been found that soluble phosphorus can be easily removed from animal wastewater, that has had a nitrification pre-treatment, in the form of an alkaline earth metal-containing phosphate which can be used as a fertilizer. Carbonate and ammonium buffers contained in liquid waste must be at least reduced or eliminated during the nitrification pretreatment which substantially reduces the overall chemical demand needed for optimum phosphorus precipitation and removal. With this process the amount of phosphorus removed, and consequently the Nitrogen:Phosphorus (N:P) ratio of the effluent, can also be adjusted to precisely match the N:P ratio needed by the growing crop or to remediate a sprayfield having excessive soil phosphorus levels by increasing the N:P ratios above the present crop requirement. This technology not only solves current problems with excessive accumulation of phosphorus in soils receiving liquid manure, it also produces a valuable phosphorus fertilizer material and at least reduce the presence of infectious microorganism. The aspect of reuse is important because, unlike nitrogen, the world phosphorus reserves are limited.

The first step of all the embodiments of the present invention is the nitrification pre-treatment of animal wastewater. Any nitrification process can be performed such as for example suspended-growth nitrification, attached-growth nitrification, etc. Biological removal of nitrogen through the process of nitrification is regarded as the most efficient and relatively low cost means of removing ammonia from wastewater (Tchobanoglous, G. and F. L. Burton, Wastewater Engineering: Treatment, Disposal, and Reuse, Boston, Mass:Irwin/McGraw-Hill, 1991). Two bacterial genera are responsible for nitrification. Nitrosomonas oxidizes ammonia to the intermediate product nitrite and nitrite is converted to nitrate by Nitrobacter. The term nitrifiers is a general term that applies to a consortia of Nitrosomonas and Nitrobacter well known in the art. Nitrifying bacteria are present in almost all aerobic biological treatment processes, but their numbers are limited. There are many aerobic processes that have been developed to favor nitrification (Tchobanoglous G. and F. L. Burton; supra). They can be separated into two main groups: suspended-growth and attached-growth. In suspended-growth nitrification, a nitrifying sludge composed of free bacteria is mixed with the wastewater liquid by the aeration or agitation of the liquid. The commonly used activated-sludge process is a suspended growth process that combines bacterial biological oxygen demand (BOD) removal and bacterial nitrification treatment (nitrogen removal) that are performed by separate bacteria. In other cases, carbon oxidation and nitrification functions are done in separate tanks.

Attached-growth nitrification uses various media so that the nitrifying bacteria attach to the surface of the media, examples include trickling filters, rotating biological contactors, packed-bed reactors, and others known in the art. Another type of attached-growth system is intermediate between suspended- and attached-growth and that is a fluidized bed biological reactor. In this type of reactor nitrifying pellets remain suspended in the fluid, i.e., fluidized by the drag forces associated with the upward flow of air and water. The nitrifying bacteria are entrapped in polymeric porous materials made of polyvinyl alcohol (PVA) or polyethylene glycol (PEG). One of the advantages of using such nitrifying pellets is that the number of microorganisms in the reactor can be increased thus removing the ammonia more quickly. Whether a fluidized bed biological reactor, a six hour process, or suspended growth process, a two day process, is used, the changes in water characteristics after treatment are the same All nitrifiers are autotrophic microorganisms that consume ammonia, oxygen, and carbon dioxide, and produce oxidized nitrogen (nitrate and nitrite) and acidity. In the present system, the nitrification process is used to remove both carbonate alkalinity and ammonia from wastewater and increase acidity. In general, any nitrification process will work provided bacteria is adapted to operate at high ammonia concentrations.

After the nitrification step, in which at least about 50% of the initial ammonia and alkalinity (carbonate and bicarbonate alkalinity) in animal wastewater is consumed, the preferred amount being greater than about 90% disappearance of nitrogen and bicarbonate alkalinity, the liquid is transferred to a separate vessel. The second step is to at least increase the pH of the nitrified wastewater. This is accomplished by adding an alkali such as for example sodium hydroxide, potassium hydroxide, etc. and alkaline earth metal salts such as calcium chloride, magnesium chloride, etc., and mixtures thereof, to precipitate the soluble phosphorus in the nitrified wastewater. The amount of alkali and/or salt added depends on the degree of phosphorus removal desired and is preferably added in the minimum quantity necessary to balance the Nitrogen:Phosphorus ratio of crops or to remediate sprayfields. Automation can be provided with a pH controller to maintain a selected treatment pH of the liquid. The alkali can be delivered to batch or continuous flow systems and it can be added in dry forms or in water mixtures of about 1–2%.

In another embodiment, the second step can include adding an alkaline earth metal-containing compound to the nitrified animal wastewater which both increases the pH and precipitates phosphorus. For purposes of the present invention, the alkaline earth metal-containing compound includes for example calcium or magnesium oxide, calcium hydroxide such as hydrated lime, caustic lime, slaked lime; magnesium hydroxide; dolomite hydrated lime; dolomite lime oxide; etc., and mixtures thereof.

The treated effluent for both embodiments can be tested periodically to determine the decrease of phosphorus and N:P content with the use of standard methods known in the art such as the phenate method (ammonia), the ascorbic acid method (phosphorus), and the cadmium reduction method (nitrate), etc.

The third step is to mix and react the chemical with the phosphate in the wastewater so that an insoluble phosphate compound is produced. The chemical is mixed with the liquid using static on-line mixers or moving mixers known in the art. Mixing time is that needed to dissolve the lime in the wastewater and varies with mixing apparatus. After dissolution, reaction time is typically about 1 to 5 minutes but precise duration should be determined for specific cases. Visual inspection can be used since the reaction is normally complete when clear precipitate flocs are evident in the mixed liquid.

In the fourth and final step, treated wastewater is passed through a sludge clarifier to remove the precipitate. Settling for at least about 20 minutes to about 240 minutes is allowed to insure that at least most if not all of the phosphorus precipitate has settled out.

The third step (mixing and reaction) and the fourth step (clarification) can be performed in separate vessels or combined in the same vessel. The phosphorus precipitate can be dewatered and used as a fertilizer or can be mixed with other materials or treated to produce useful phosphorus products such as calcium orthophosphates (superphosphates), ammonium phosphates, or feed additives. To dewater, the precipitated phosphorus is dewatered to approximately at least about 20% solids, the preferred amount being at least about 50% solids, using filter bags, drying beds, evaporative dewatering, presses, and other dewatering methods known to the art, etc. The dewatering/bagging equipment (Draimad for example) is a sludge dewatering equipment (Aeromod, Kan.). As the precipitated phosphorus falls into the bags from the reactor tank, the water drains through the porous bags, leaving solids within the bags. Flocculants, such as polyacrylamides (PAMs), especially anionic PAMs, are useful to help; clarify the precipitated phosphorus by increasing the removal of the suspended precipitated phosphorus from the wastewater. Examples of anionic PAMs useful in the present invention include Magnifloc 835A, 844A, 1820A, 1839A, and 1883A (All from Cytec Industries, Inc., West Paterson, N.J.), Percol 790 and 712, Magnafloc E32 (all from Ciba Specialty Chemicals Water Treatment, Inc., Suffolk, Va.), etc. A totally automatic operation continues to add settled solids until it senses the bags are full and the system shuts itself down. Once full, the bags are stacked outdoors on pallets. The bag material allows air to enter for natural drying, yet repels rainwater, making it possible to dewater year around. To obtain a high-purity material, the liquid after the nitrification step is passed through a clarifier (settling unit, membrane filtration unit, etc.) before reaction with lime. For purposes of the present invention, high-purity is defined to be at least about greater than about 15% $P_2O_5$.

Since ammonia nitrogen has been converted to nitrate, increased pH does not result in gaseous nitrogen loss. Therefore, the amount of phosphorus removed, and consequently the N:P ratio of the effluent, can also be adjusted in this process to precisely match the N:P ratio needed by the growing crop to which it will be applied. In addition to providing a wastewater treatment system which is capable of regulating the N:P nutrient ratio of waste applied to land, the process can be applied to remediate a sprayfield having excessive soil phosphorus levels by removing all the phosphorus from wastewater.

The alkaline earth metal-containing compound reacts with the bicarbonate alkalinity of animal wastewater to form a carbonate, with ammonium to form ammonia and with phosphate to precipitate phosphate compounds (Loehr et al., 1973, supra; Tchobanoglous and Burton, 1991, supra). Using calcium hydroxide as an example, the following equations define the reactions:

$$Ca(OH)_2 + Ca(HCO_3)_2 \rightarrow 2CaCO_3\downarrow + 2H_2O \quad (1)$$

$$5Ca^{++} + 4OH^- + 3HPO_4^= \rightarrow Ca_5OH(PO_4)_3\downarrow + 3H_2O \quad (2)$$

The reaction in Equation 1 is complete above a pH of about 9.5 while that of equation 2 starts above about a pH of 7 but is very slow below about a pH of 9. As the pH value of the wastewater increases beyond about 10, excess calcium ions will then react with the phosphate, as shown in equation 2, to precipitate calcium phosphate compounds. Not recognized is the fact that in wastewater containing high ammonia concentration, the lime dose required to elevate the pH is additionally increased due to the ammonium-ammonia reaction shown below in equation 3 that neutralizes the hydroxyl ions:

$$CA(OH)_2 + 2NH_4^+ \rightarrow 2NH_3\uparrow + Ca^{++} + 2H_2O \quad (3)$$

Figure 9:
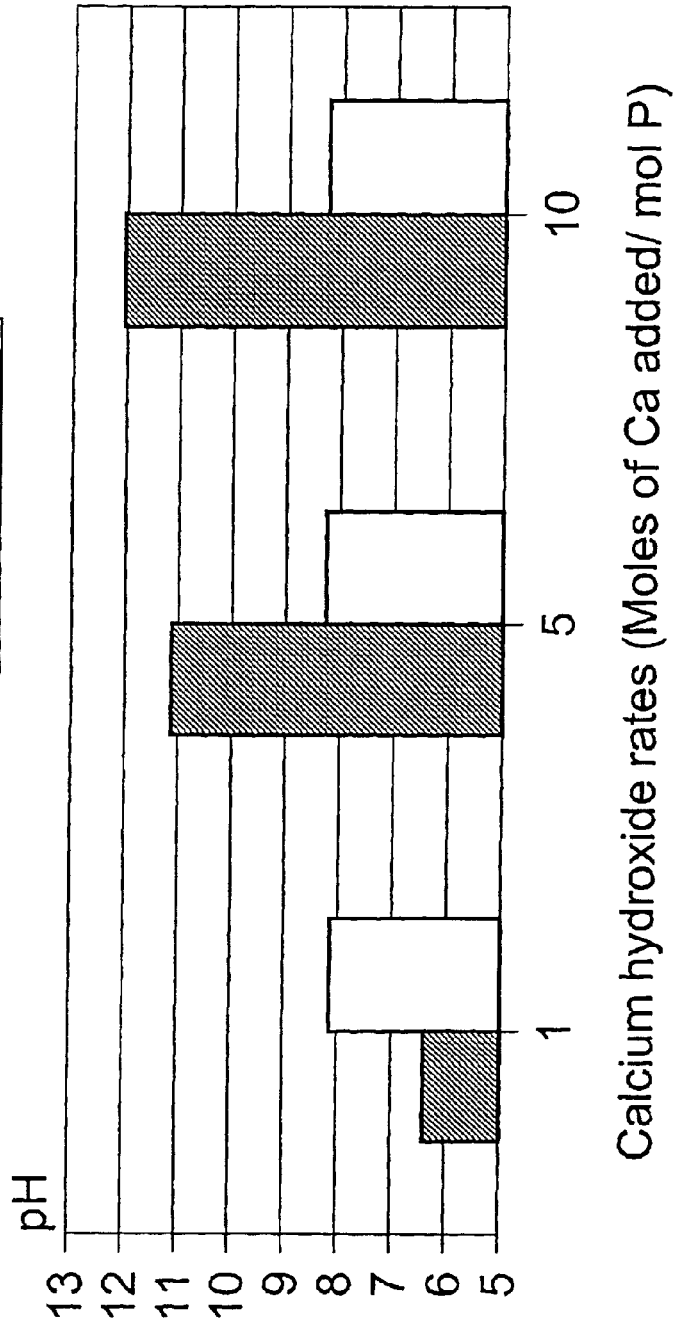
FIG. 9 is a graph showing phosphorus removal from swine wastewater using calcium hydroxide and the effect on pH.

Therefore, precipitation of phosphate in animal wastewater using an alkaline earth metal-containing compound such as lime for example is very difficult due to the inherently high buffer capacity of these wastes ($NH_4$—$N \geq 200$ mg/L and alkalinity $\geq 1200$ mg/L) which prevents rapid changes in pH. as shown in the control treatment in FIG. 9. This problem is solved with the present invention using a pre-nitrification step that eliminates both ammonia (Equation 4) and bicarbonate alkalinity (Equation 5):

$$NH_4^+ + 2O_2 \rightarrow NO_3^- + 2H^+ H_2O \quad (4)$$

$$HCO_3^- + H^+ \rightarrow CO_2\uparrow + H_2O \quad (5)$$

As a result, the buffering problem of ammonia (Equation 3) is crossed out with ammonia oxidation (Equation 4) and the problem of carbonate buffers (Equation 1) is crossed out with the acid produced during nitrification (Equation 5), leaving an un-buffered system that promotes phosphate removal (Equation 2) when smaller amounts of lime are added.

Relative to initial levels, a reduction of at least about 50% of the ammonia and bicarbonate alkalinity is necessary during the pre-nitrification step for the present invention.

The above described process is applicable to any wastewater. One of ordinary skill in the art can readily determine concentrations of an alkaline earth metal containing compound such as lime for example to add to obtain phosphorus removal. Municipal wastewater contains much lower concentrations of phosphorus and the strategy followed is to reduce a few parts per million phosphorus concentration to meet discharge requirements in public waters. The animal problem is quite different and the concentration of phosphorus in animal wastewater is one order of magnitude higher than in municipal systems. In animal wastes, the interest of the industry is in mass removal so that the capacity of phosphorus assimilation by land surrounding the confined animal operation is not exceeded which would cause excessive phosphorus accumulation in soil and environmental problems due to runoff and movement of phosphorus into lakes and rivers. In some situations, for example, a farmer may need to remove about 50% of the phosphorus from the farm to comply with environmental regulations or be able to expand current operation. The present process is flexible enough to increase or decrease the amount of phosphorus removed from a farm based on particular needs of the operation.

Figure 2:
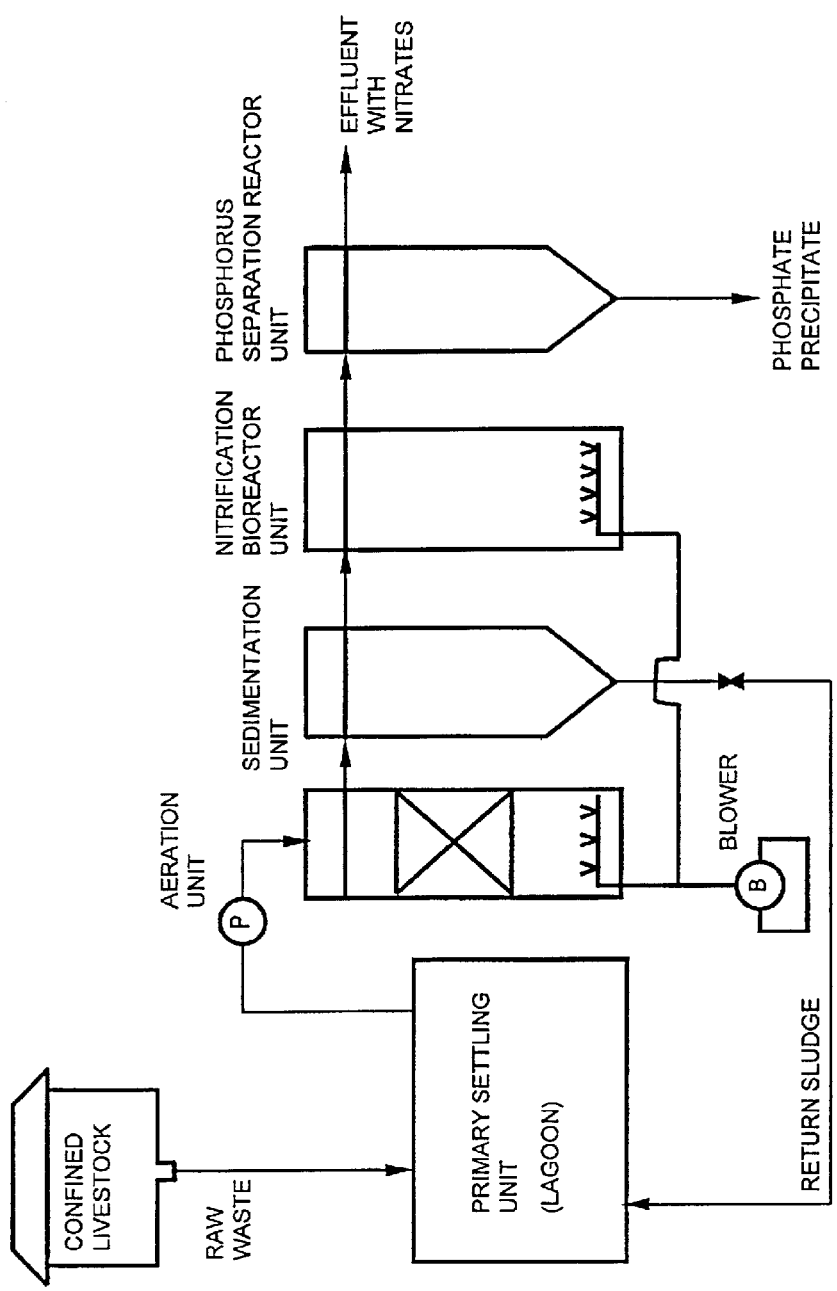
FIG. 2 is a schematic drawing of a system of the invention that includes a lagoon.
Figure 3:
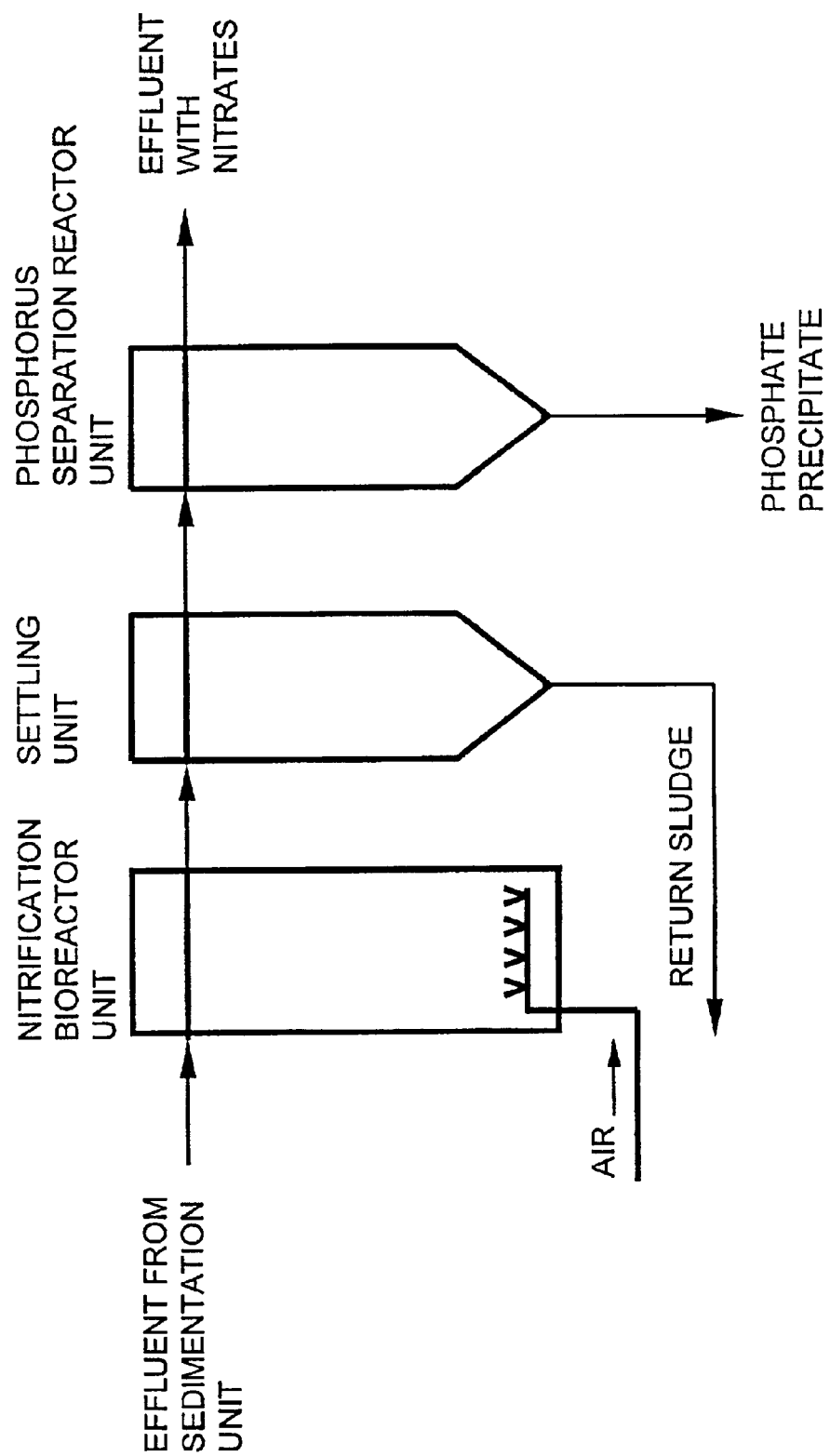
FIG. 3 is a schematic drawing of a system of the invention which utilizes a settling unit between the nitrification bioreactor and the phosphorus separation reactor.
Figure 4:
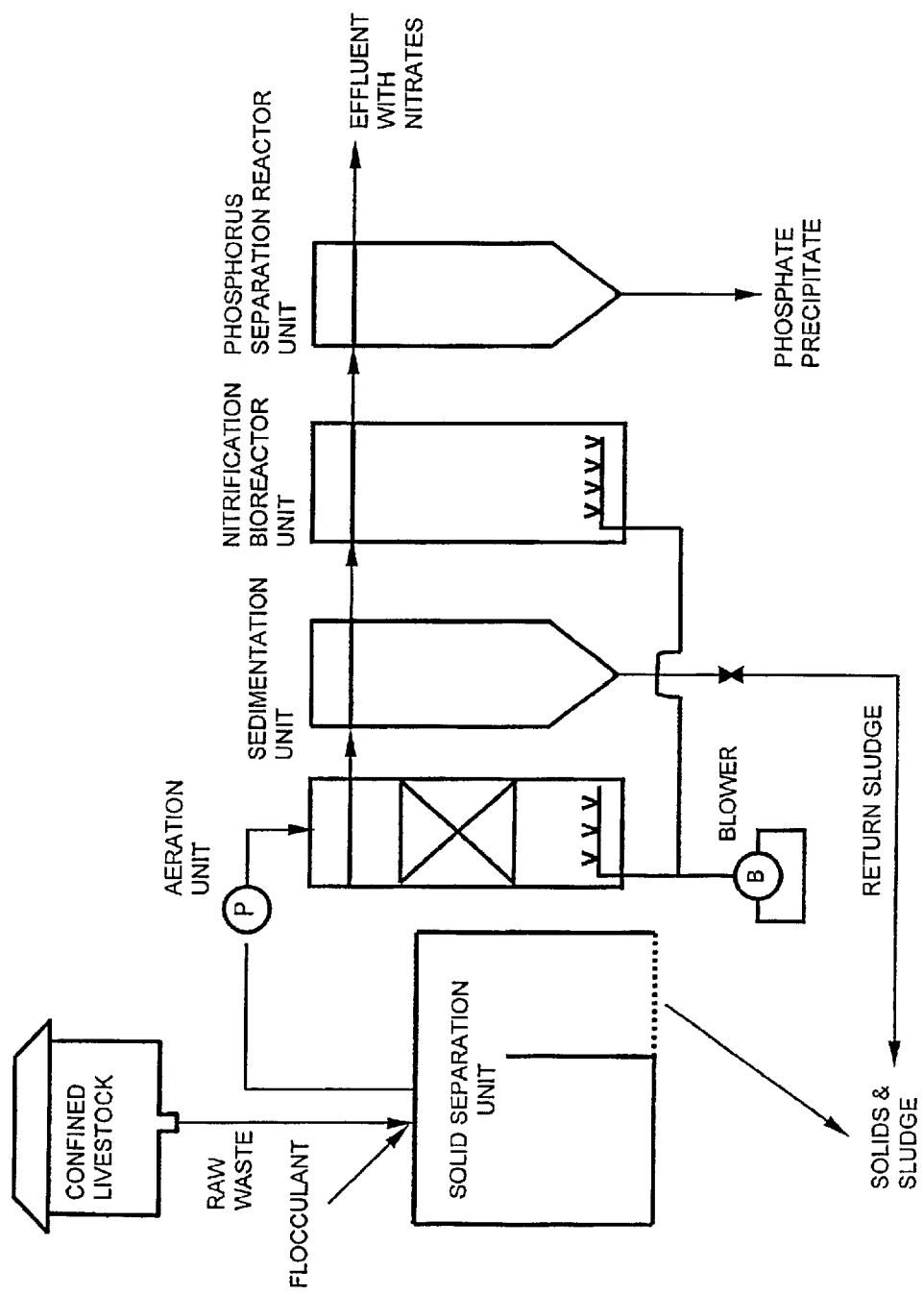
FIG. 4 is a schematic drawing of a lagoonless system of the invention which includes a solid separation unit, an aeration unit, and a sedimentation unit prior to the nitrification bioreactor and phosphorus separation reactor unit.
Figure 5:
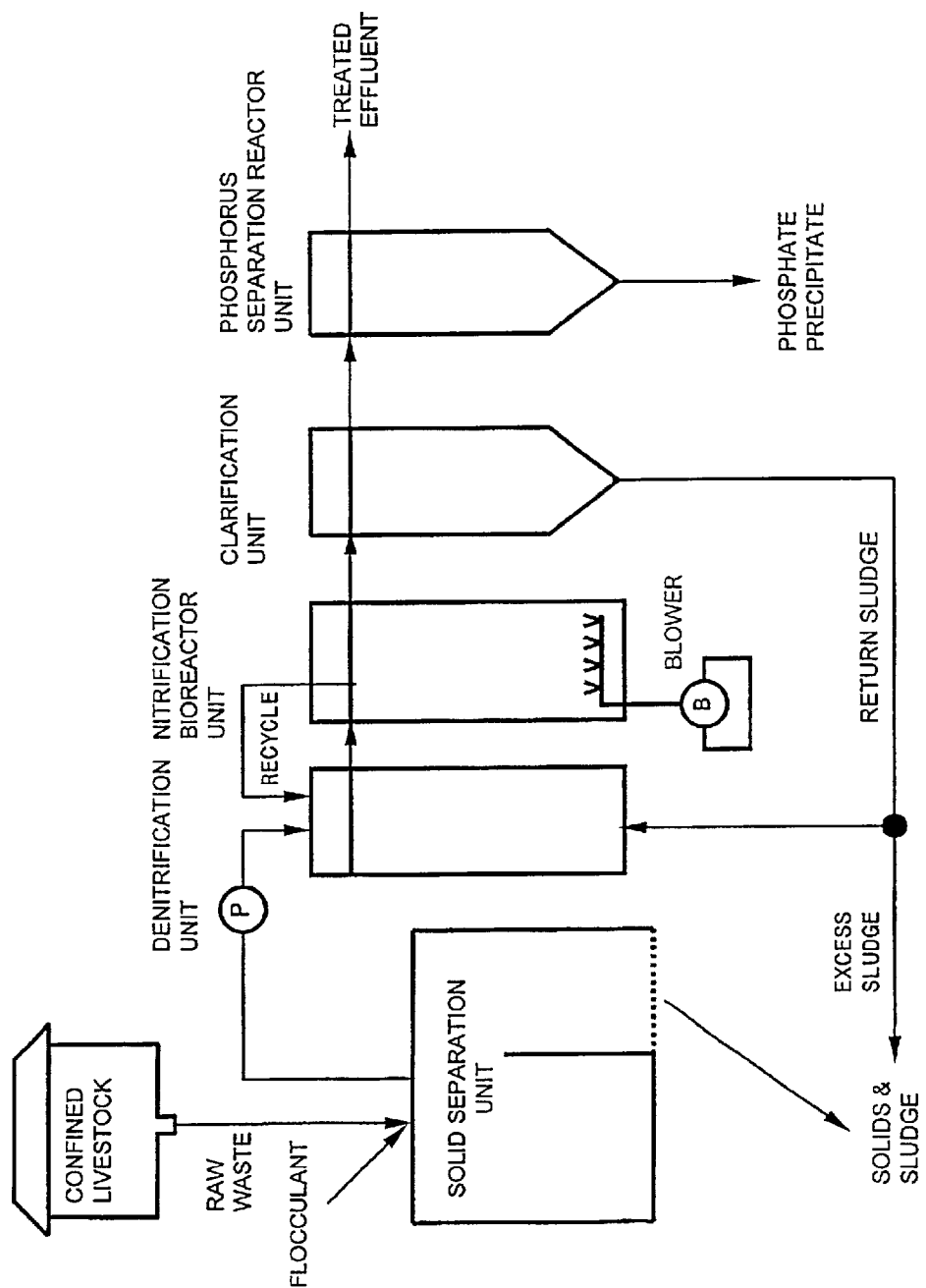
FIG. 5 is a schematic drawing of a lagoonless system of the invention which includes a solid separation unit and a denitrification/nitrification unit prior to the phosphorus separation reactor unit.

The present invention may be used in systems without lagoons (FIGS. 1, 3, 4, and 5) and in systems with lagoons (FIG. 2). In systems without lagoons, fresh flushed manure is first treated with polyacrylamide (PAM) polymer to separate at least about 80% of the suspended solids, then subjected to a nitrogen removal using nitrification and denitrification and then phosphorus is precipitated as described above. The denitrificfation step is preferably a biological process that converts nitrate into harmless nitrogen gas, $N_2$. PAM is a water-soluble polymer that clumps the fine, suspended particles typical of animal manure into larger particles or flocs. Cationic PAM is very effective and cationic PAMs with a moderate charge density, approximately 20%, are more effective than those with a higher charge density. Examples of cationic PAMs useful in the present invention include Magnifloc 494C, 496C, 1594C, 1596C, and 234GD, Excel 5020, Excel 5040, Excel 5055, Excel 5000, (all from Cytec Industries Inc., West Paterson, N.J.), Percol 709, 737, and 767, Zetag 7822 and 7823, (all from Ciba Specialty Chemicals Water Treatment, Inc., Suffolk, Va.), etc. An effective amount of PAM for purposes of this invention is any amount which substantially increases the capture and removal of fine suspended solids and associated nutrients. To substantially increase capture and removal of fine suspended solids and associated nutrients would include any amount which removes at least about 50% of total suspended solids, volatile suspended solids, chemical oxygen demand, and organic nutrients. This enhances the separation efficiency of both screens and filters found in wastewater treatment systems. The liquid effluent after solids removal with polymer is similar to that after anaerobic lagoon treatment, so one process can replace the other, and the nitrification treatment removes the ammonia and alkalinity so the same concept for phosphorus removal applies with either lagoons or systems without lagoons. By capturing the suspended particles, most of the volatile and oxygen-demanding organic compounds are removed from the liquid stream. Instead of being used to break down organic compounds, the oxygen in the aeration treatment is used efficiently to convert ammonia to nitrite or nitrate. The system of the present invention where a solids separation step is added with PAM before nitrification/Phosphorus removal sequence (solids separation with polymer →biological nitrogen removal using nitrification or nitrification/denitrification→phosphorus removal, FIG. 5) has the advantage that treatment lagoons are not required and the land area required for nutrient disposal is reduced.

The following examples are intended only to further illustrate the invention and are not intended to limit the scope of the invention which is defined by the claims. Swine wastewater is used as a model system for the present invention.

EXAMPLE 1

Figure 6:
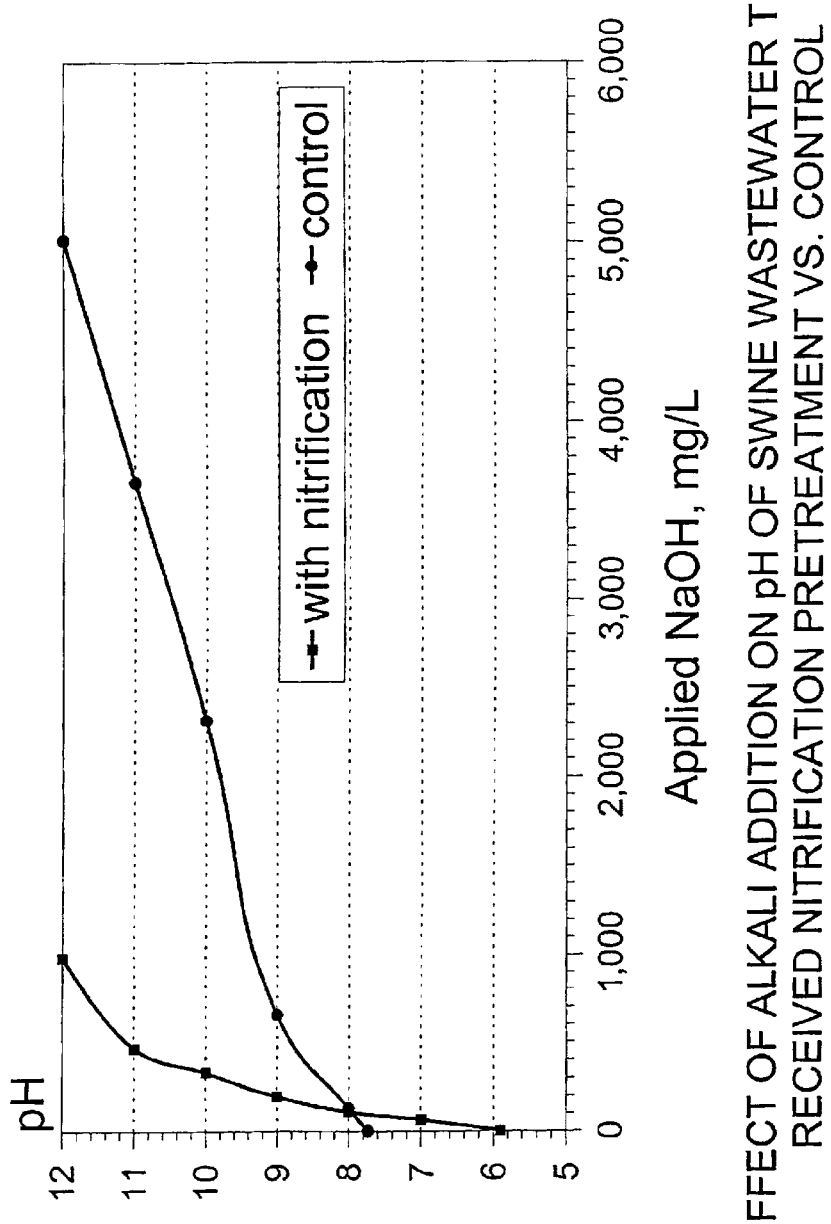
FIG. 6 is a graph showing the effect of alkali addition on pH of swine wastewater that received nitrification pretreatment versus control.
Figure 7:
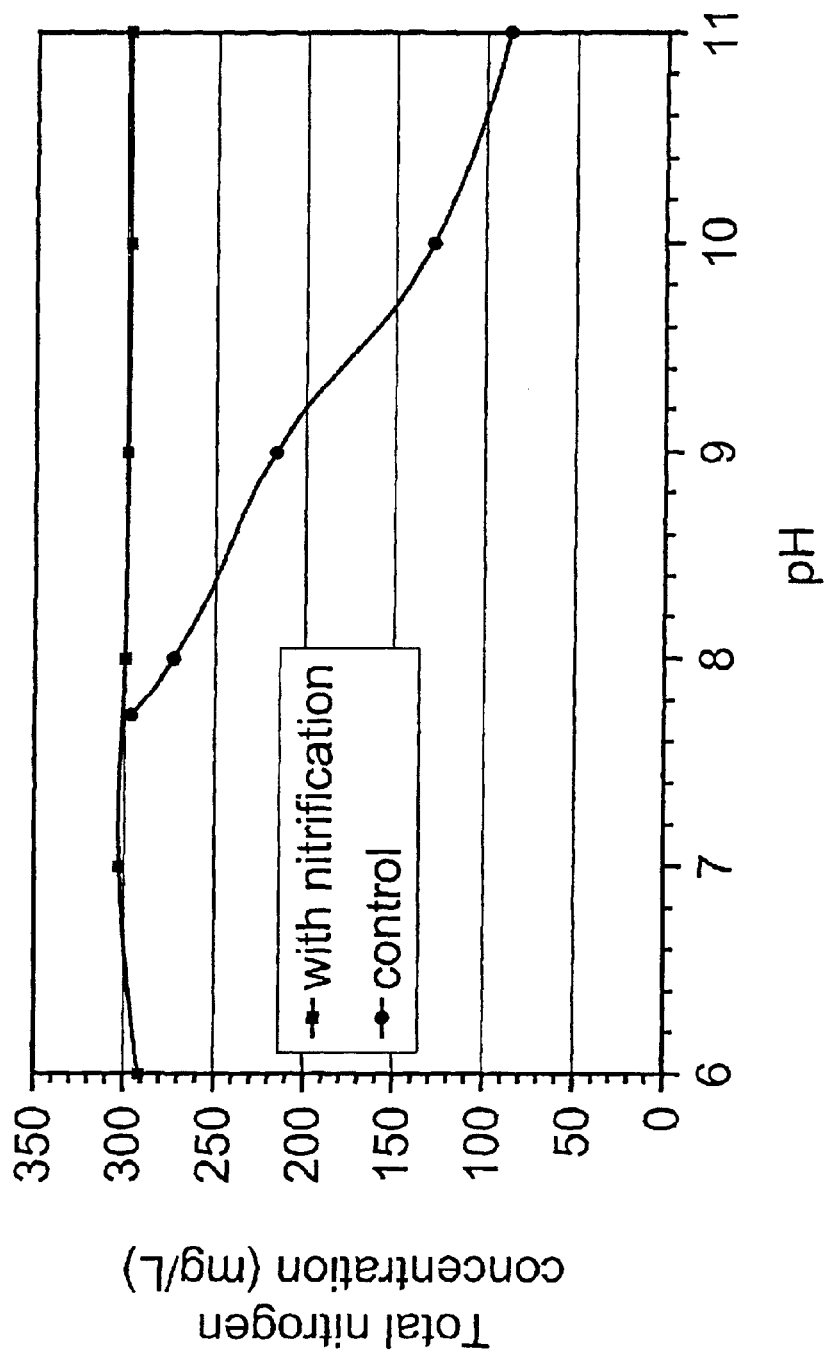
FIG. 7 is a graph showing nitrogen losses in swine wastewater by ammonia volatilization.

Lagoon wastewater from a swine operation was treated in a nitrification vessel during about a 16 hour period. The vessel contained nitrifying bacteria immobilized in pellets made of polyvinyl alcohol (PVA) polymer and aeration that provided oxygen and fluidization of the immobilized pellets (Vanotti and Hunt, 2000; supra; herein incorporated by reference). The nitrifying pellets increased microbial population in the vessel which reduced total treatment time of nitrification. During this nitrification pre-treatment, the natural carbonate alkalinity of about 1880 mg $CaCO_3$/L of the wastewater was exhausted with a remaining alkalinity of about 63 mg $CaCO_3$/L in the process of ammonia oxidation (approximately 300 mg nitrogen/L), and the pH decreased from about 7.8 to approximately 6. Even though a pH higher than 9 is needed to optimize precipitation of soluble phosphorus using Ca and Mg based compounds, according to the present invention, the pH of the wastewater is initially lowered with the acid produced by the nitrifying bacteria. However, since the wastewater is low in ammonia and carbonate buffers, the total amount of alkali needed to increase the pH above 9 is substantially reduced. For example, about 193 mg/L of NaOH were needed to increase the pH of the nitrified wastewater from about pH 6.0 to about pH 9.0. This compares with 656 mg/L needed in the same wastewater without a nitrification pre-treatment (control) to increase the pH from about 7.8 to about 9.0 (See FIG. 6) This difference is even more pronounced at higher pH levels. For example, to increase the pH to about 10.0, a total of about 328 mg NaOH/L were needed for the nitrified wastewater versus about 2316 mg/L for the control wastewater. Another advantage of the present invention is that it minimizes nitrogen losses by ammonia volatilization at the high pH greater than about 9.0 needed to precipitate phosphorus using Calcium and Magnesium compounds; for example, concentration of ammonia-nitrogen in the liquid decreased from about 296.6 mg/L to about 216.4, 128.8 and 87.0 mg/L when the pH in the control was increased to about 9, 10, and 11, respectively (FIG. 7). These decreases correspond to losses of about about 80.2, 167.8, and 209.6 mg/L of ammonia-nitrogen, respectively, and the losses increased with increased pH up to about 75% at pH 12 (FIG. 7). This problem is also solved with the nitrification/phosphorus removal system since the nitrogen is mostly $NO_3^-$ form which is not affected when alkali is added for phosphorus precipitation.

EXAMPLE 2

This example demonstrates the use of the above described method to change the N:P ratio of animal wastewater by means of varying calcium addition rates and/or the pH of the reaction. Swine wastewater was nitrified as described above in example 1. It was then transferred to separate laboratory vessels where it was treated with calcium and alkali chemicals to obtain Ca:P molar ratios of about 0, 0.5, 1.0, 2.0, 3.0, 5.0, and 10; and pHs in the range of about 9 to about 12 in one unit increments through addition of $CaCl_2$ and standard NaOH, respectively (See Table 1 below). The rates of calcium applied were calculated based on the initial phosphorus concentration in the wastewater (about 60 mg/L or about 1.937 mmol/L) to establish a range of Ca:P molar ratios resulting in about 285 mg $CaCl_2$/L applied for each Ca:P molar ratio unit increment. The same pH and Ca treatments were also applied to influent wastewater that was not nitrified (control);for comparison purposes. All experiments were duplicated. First the calcium treatment was applied to the wastewater, then NaOH alkali was added to the same vessel while mixing with a stirrer until the desired pH was reached. Treated wastewater was sampled in the supernatant after about a 0.5 hour gravity sedimentation period and analyzed for phosphate ($PO_4$—P) nitrate-nitrogen ($NO_{32}$—N) and ammonium ($NH_4$—N). The amounts of phosphorus removed in the various treatments were calculated by subtracting the final effluent $PO_4$—P concentration with the initial level (60.0 mg P/L).

Results are shown in Table 1 below and indicate that similar phosphorus removal efficiencies are obtained in the nitrification/phosphorus removal system and the control system when the same pH and calcium treatment are applied. However, the process of the instant invention requires significantly lower quantities of alkali addition in order to reach optimum pH for precipitation of phosphate with calcium. The data also reveals that removal of phosphorus increases with pH up to about 10.0 and higher values will not increase efficiency. A complete range of phosphorus removal efficiencies is possible with Ca:P molar ratios of about 1 to about 5 and final pH of about up to 10 to accommodate a range of phosphorus removal goals by users of the process. In addition to the lower chemical demand, another important advantage of the process of the invention is that N:P ratios of the treated liquid waste can be effectively modified according to specific farming needs. In previous systems, increased pH due to lime additions to liquid manure results in large losses of ammonia gas as shown in the control data. Ammonia volatilization from animal operations is an environmental problem in and of itself. In addition, this nitrogen loss makes it very difficult to control the final N:P ratio of the liquid and will always result in much lower N:P ratios even when the same pH and calcium treatment is applied (See Table 1). Liquid waste from animal operations typically contain a N:P ratio less than about 5. Using data from Edwards and Daniels (1992, supra) shown in Table 2 below, it can be seen that, when liquid animal manures are used to supply nitrogen requirements, phosphorus will be in excess for most forage crops and all field crops. This indicates that with the process of the instant invention the treated wastewater can be land applied at higher application rates without accumulating excess phosphorus in the soil. For example, a final N:P ratio of about 13.4 would be needed to match Coastal bermudagrass specific nutrient uptake needs, which can be delivered with a Ca:P molar ratio of about 1 and a pH of about 9. Higher N:P ratios would be prescribed to clean phosphorus polluted spray fields. This remediation uses a negative mass phosphorus balance between phosphorus applied and phosphorus removed by harvestable plant materials that is achieved with irrigation of treated wastewater having N:P ratios in the range of about 15 to about 300. The higher this number, the shorter the time needed by a succession of crops to deplete soil phosphorus and bring back soil phosphorus test to environmentally acceptable levels. Other cases are possible where sufficient land for effluent disposal is not available or land application of nitrogen and phosphorus is not desirable. Accordingly, denitrification processes may be employed to convert the nitrate-nitrogen into nitrogen gas ($N_2$) and provide an effluent virtually free from nutrients, so that its final acceptability for discharge is enormously improved.

TABLE 1

| Treatment pH* | NaOH applied mg/L | Ca applied† Ca/P molar ratio | Phosphate in solution mg/L | P removed % | NH₄—N mg N/L | NO₃—N mg N/L | Total N‡ mg N/L | N/P ratio¶ mg N/mg P |
|---|---|---|---|---|---|---|---|---|
| \multicolumn{9}{c}{Influent (Lagoon Liquid)} |
| 7.73 | 0 | 0.0 | 60.0 | 0.0 | 296.6 | 0.0 | 296.6 | 4.9 |
| \multicolumn{9}{c}{Treated Effluent Without Nitrification Step} |
| 9.00 | 529 | 0.0 | 38.3 | 36.2 | 216.4 | 0.0 | 216.4 | 5.7 |
| 9.00 | 533 | 0.5 | 23.7 | 60.5 | 219.4 | 0.0 | 219.4 | 9.3 |
| 9.00 | 660 | 1.0 | 18.7 | 68.8 | 222.2 | 0.0 | 222.2 | 11.9 |
| 9.00 | 616 | 2.0 | 12.0 | 80.0 | 222.7 | 0.0 | 222.7 | 18.6 |
| 9.00 | 635 | 3.0 | 9.3 | 84.5 | 228.2 | 0.0 | 228.2 | 24.5 |
| 9.00 | 772 | 5.0 | 4.9 | 91.8 | 228.1 | 0.0 | 228.1 | 46.6 |
| 9.00 | 1071 | 10.0 | 4.2 | 93.0 | 223.5 | 0.0 | 223.5 | 53.2 |
| 10.00 | 1565 | 0.0 | 23.1 | 61.5 | 128.8 | 0.0 | 128.8 | 5.6 |
| 10.00 | 1547 | 0.5 | 16.1 | 73.2 | 129.8 | 0.0 | 129.8 | 8.1 |
| 10.00 | 1602 | 1.0 | 13.5 | 77.5 | 124.3 | 0.0 | 124.3 | 9.2 |
| 10.00 | 1648 | 2.0 | 9.8 | 83.7 | 133.8 | 0.0 | 133.8 | 13.7 |
| 10.00 | 1686 | 3.0 | 7.7 | 87.2 | 121.8 | 0.0 | 121.8 | 15.8 |
| 10.00 | 1715 | 5.0 | 8.0 | 86.7 | 145.4 | 0.0 | 145.4 | 18.2 |
| 10.00 | 1887 | 10.0 | 4.1 | 93.2 | 146.3 | 0.0 | 146.3 | 35.7 |
| 11.00 | 2766 | 0.0 | 22.3 | 62.8 | 87.0 | 0.0 | 87.0 | 3.9 |
| 11.00 | 2749 | 0.5 | 15.9 | 73.5 | 88.5 | 0.0 | 88.5 | 5.6 |
| 11.00 | 2729 | 1.0 | 12.4 | 79.3 | 97.7 | 0.0 | 97.7 | 7.9 |
| 11.00 | 2764 | 2.0 | 8.2 | 86.3 | 97.4 | 0.0 | 97.4 | 11.9 |
| 11.00 | 2714 | 3.0 | 6.9 | 88.5 | 96.9 | 0.0 | 96.9 | 14.0 |
| 11.00 | 2656 | 5.0 | 4.8 | 92.0 | 109.7 | 0.0 | 109.7 | 22.9 |
| 11.00 | 2691 | 10.0 | 1.7 | 97.2 | 107.0 | 0.0 | 107.0 | 62.9 |
| 12.00 | 3163 | 0.0 | 28.2 | 53.0 | 73.2 | 0.0 | 73.2 | 2.6 |
| 12.00 | 3887 | 0.5 | 15.3 | 74.5 | 74.0 | 0.0 | 74.0 | 4.8 |
| 12.00 | 3546 | 1.0 | 8.0 | 86.7 | 71.0 | 0.0 | 71.0 | 8.9 |
| 12.00 | 3576 | 2.0 | 6.5 | 89.2 | 79.8 | 0.0 | 79.8 | 12.3 |
| 12.00 | 3578 | 3.0 | 5.2 | 91.3 | 89.6 | 0.0 | 89.6 | 17.2 |
| 12.00 | 3436 | 5.0 | 3.9 | 93.5 | 83.6 | 0.0 | 83.6 | 21.4 |
| 12.00 | 3383 | 10.0 | 2.8 | 95.3 | 69.4 | 0.0 | 69.4 | 24.8 |
| \multicolumn{9}{c}{Treated Effluent After Nitrification Step} |
| 9.0 | 147 | 0.0 | 53.1 | 11.5 | 39.5 | 259.6 | 299.1 | 5.6 |
| 9.0 | 160 | 0.5 | 37.6 | 37.3 | 42.1 | 251.9 | 294.0 | 7.8 |
| 9.0 | 170 | 1.0 | 21.8 | 63.7 | 42.4 | 249.3 | 291.7 | 13.4 |
| 9.0 | 176 | 2.0 | 7.9 | 86.8 | 40.3 | 254.0 | 294.3 | 37.3 |
| 9.0 | 195 | 3.0 | 3.2 | 94.7 | 41.4 | 242.1 | 283.5 | 88.6 |
| 9.0 | 195 | 5.0 | 1.7 | 97.2 | 41.2 | 253.4 | 294.6 | 173.3 |
| 9.0 | 201 | 10.0 | 1.2 | 98.0 | 41.7 | 254.0 | 295.7 | 246.4 |
| 10.0 | 330 | 0.0 | 30.1 | 49.8 | 19.4 | 246.8 | 266.2 | 8.8 |
| 10.0 | 345 | 0.5 | 17.2 | 71.3 | 14.7 | 234.4 | 249.1 | 14.5 |
| 10.0 | 347 | 1.0 | 10.6 | 82.3 | 16.6 | 245.2 | 261.8 | 24.7 |
| 10.0 | 345 | 2.0 | 3.4 | 94.3 | 20.3 | 238.6 | 258.9 | 76.1 |
| 10.0 | 372 | 3.0 | 2.3 | 96.2 | 20.0 | 238.0 | 258.0 | 112.2 |
| 10.0 | 357 | 5.0 | 0.9 | 98.5 | 21.8 | 240.6 | 262.4 | 291.6 |
| 10.0 | 357 | 10.0 | 1.0 | 98.3 | 20.8 | 243.7 | 264.5 | 264.5 |
| 11.0 | 432 | 0.0 | 31.1 | 48.2 | 9.0 | 248.8 | 257.8 | 8.3 |
| 11.0 | 484 | 0.5 | 15.4 | 74.3 | 8.4 | 248.3 | 256.7 | 16.7 |
| 11.0 | 430 | 1.0 | 7.3 | 87.8 | 10.0 | 243.2 | 253.2 | 34.7 |
| 11.0 | 446 | 2.0 | 3.8 | 93.7 | 10.2 | 233.9 | 244.1 | 64.2 |
| 11.0 | 451 | 3.0 | 1.7 | 97.2 | 9.8 | 233.4 | 243.2 | 143.1 |
| 11.0 | 488 | 5.0 | 0.5 | 99.2 | 10.7 | 224.7 | 235.4 | 470.8 |
| 11.0 | 451 | 10.0 | 0.2 | 99.7 | 15.4 | 227.3 | 242.7 | 1214.0 |
| 12.0 | 877 | 0.0 | 28.2 | 53.0 | 4.6 | 271.5 | 276.1 | 9.8 |
| 12.0 | 884 | 0.5 | 13.3 | 77.8 | 4.3 | 262.9 | 267.2 | 20.1 |
| 12.0 | 851 | 1.0 | 5.1 | 91.5 | 5.2 | 268.4 | 273.6 | 53.6 |
| 12.0 | 929 | 2.0 | 3.0 | 95.0 | 4.6 | 254.8 | 259.4 | 86.5 |
| 12.0 | 919 | 3.0 | 0.5 | 99.2 | 4.8 | 267.5 | 272.3 | 544.6 |
| 12.0 | 967 | 5.0 | 3.1 | 94.8 | 5.1 | 259.4 | 264.5 | 85.3 |
| 12.0 | 975 | 10.0 | 0.6 | 99.0 | 5.9 | 240.6 | 246.5 | 410.8 |

*pH Treatment was obtained by addition of sodium hydroxide.
†Ca Treatment was obtained by addition of calcium chloride. Amount of Ca added to obtain specific Ca:P molar ratio in the range of about 0 to 10 (applied Ca:P in the influent)
‡Total N is the sum of ammonia ($NH_4$—N) and nitrate ($NO_3$—N) nitrogen
¶N:P ratio = Total N concentration:Total P concentration

TABLE 2

|  | N | P | N:P |
|---|---|---|---|
| Forage crops | | | |
| Coastal bermudagrass | 400–675 | 35–45 | 13.4:1 |
| Kentucky bluegrass | 200–270 | 45 | 5.2:1 |
| Ryegrass | 200–280 | 60–85 | 3.3:1 |
| Sweet clover | 175 | 20 | 8.8:1 |
| Tall fescue | 150–325 | 30 | 11.9:1 |
| Orchardgrass | 250–350 | 20–50 | 8.6:1 |
| Field crops | | | |
| Corn | 175–200 | 20–30 | 7.5:1 |
| Cotton | 75–110 | 15 | 6.2:1 |
| Grain sorghum | 135 | 15 | 9:1 |
| Soybeans | 250 | 10–20 | 16.7:1 |
| Wheat | 160 | 15 | 10.7:1 |

Data from Edwards, D. R., and T. C. Daniel. 1992. Environmental impacts of on-farm poultry waste disposal - A review. Bioresource Technology 41(1):9–33.

EXAMPLE 3

Figure 8:
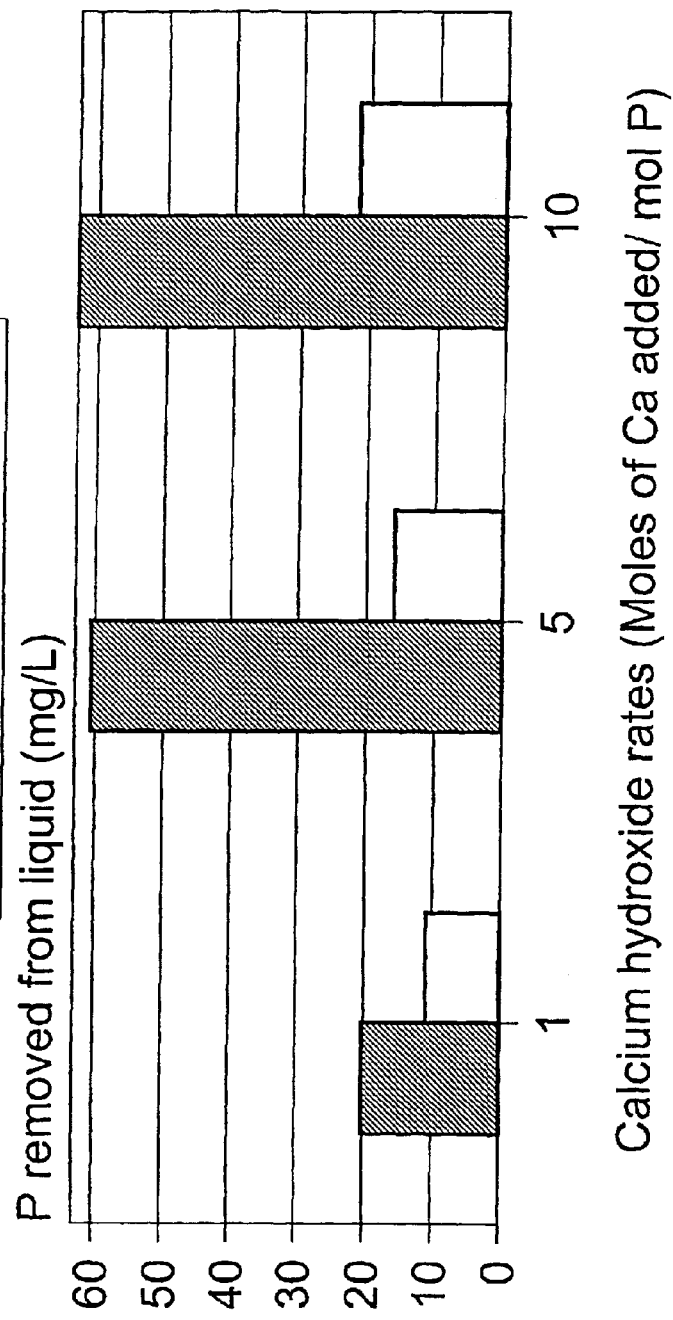
FIG. 8 is a graph showing phosphorus removal from swine wastewater using calcium hydroxide.

To illustrate that a single compound can be used to elevate pH and at the same time provide the extra Ca or Mg needed to precipitate phosphorus, hydrated lime was used for the chemical addition step. Swine wastewater was nitrified as described above in example 1 to remove ammonia and alkalinity and transferred to a separate laboratory vessel where it was treated with hydrated lime ($Ca(OH)_2$ at a rate of about 151, 753, and 1506 mg/L to obtain Ca:P molar ratios of about 1.0, 5.0, and 10.0 (See FIGS. 8 and 9). The rates of calcium applied were calculated based on the initial orthophosphate concentration in the wastewater (about 63 mg phosphorus/L or about 2.03 mmol phosphorus/L). Identical lime treatments were also applied to the control. The nitrification step was omitted in the control. All experiments were duplicated. Fixed amounts of lime corresponding to each treatment were added to reaction vessels containing either nitrified wastewater or wastewater that had not been nitrified (control) and mixed with a stirrer for one minute. Treated wastewater was sampled in the supernatant after about a 0.5 hour gravity sedimentation period and analyzed for nutrients as described above in example 1. Results showed that the pH in the control was not significantly increased by treatment (pH of about 8.05 to about 8.27; see FIG. 9) and as a consequence phosphorus removal rates were low (about <34%; see FIG. 8). In the nitrification/phosphorus removal sequence, the pH increased up to about 12 and phosphorus removal increased to about 100% using exactly the same lime rates of the control (FIGS. 8 and 9).

EXAMPLE 4

Figure 10:
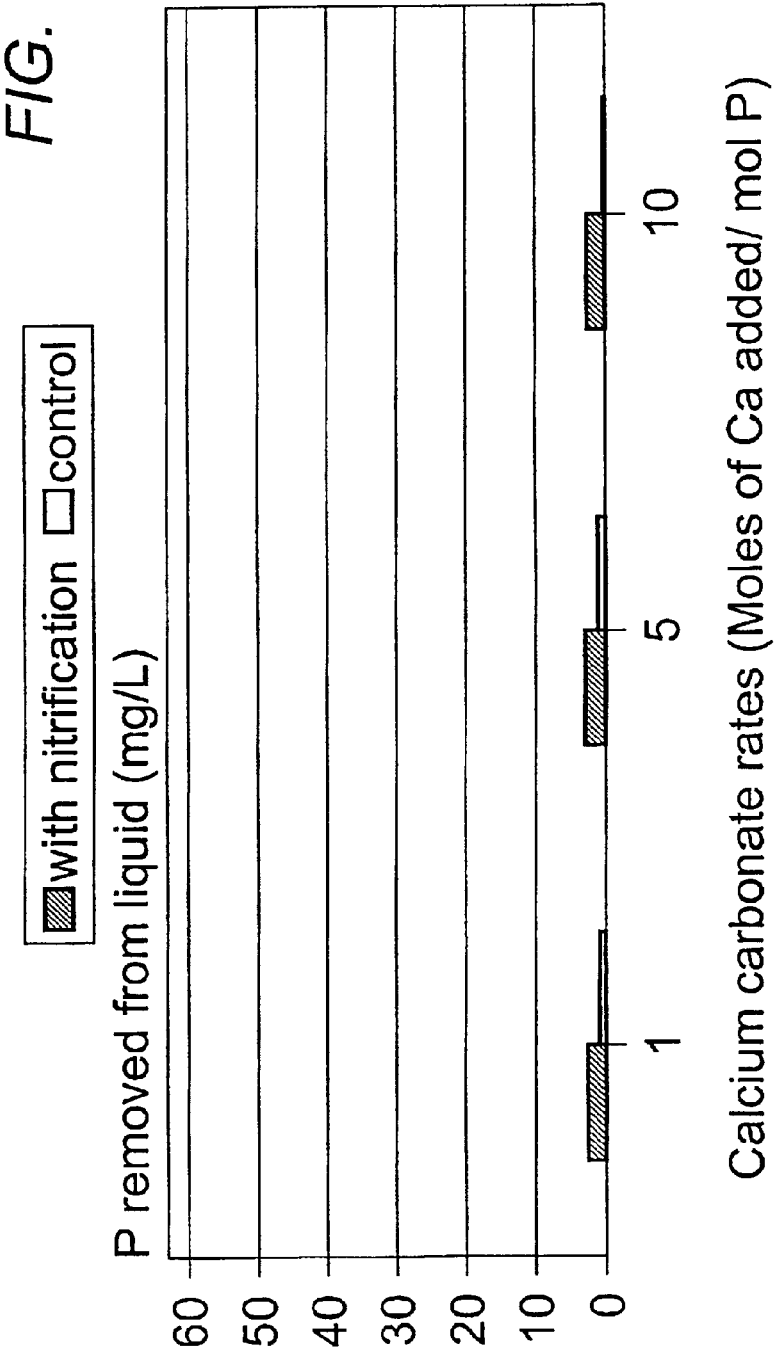
FIG. 10 is a graph showing the use of calcium carbonate lime for the removal of phosphorus from swine wastewater.

The following example illustrates that calcium carbonate is not effective to precipitate phosphorus from animal wastewater. Lagoon wastewater from a swine operation was treated as described above in Example 3 to test the effectiveness of calcium carbonate lime for removal of phosphorus from swine wastewater. Swine wastewater was nitrified as described above in example 1 and transferred to separate laboratory vessels where it was treated with calcium carbonate lime to obtain Ca:P molar rations of about 1.0, 5.0 and 10.0 moles of calcium added per mole of phosphorus (FIGS. 10 and 11). The rates of calcium applied were calculated based on the initial phosphorus concentration in the wastewater (about 63 mg/L or about 2.03 mmol phosphorus/L). The nitrification step was omitted for the control. All experiments were duplicated. Fixed amounts of calcium carbonate lime corresponding to each treatment were added to reaction vessels containing either nitrified wastewater or wastewater that had not been nitrified (Control) and mixed with a stirrer for one minute. Treated wastewater was sampled in the supernatant after about a 0.5 hour gravity sedimentation period and analyzed for nutrients as in Example 1 above. Results show that the pH of the control did not significantly increase by treatment (FIG. 11) and the phosphorus removal rates were low (FIG. 10). Similarly, in the nitrification/phosphorus removal sequence, the pH did not increase and phosphorus removal was low (FIGS. 10 and 11).

EXAMPLE 5

To illustrate that any nitrification process will work with the present invention, a sequencing batch reactor (SBR) was used for the nitrification step as an example of a widely used suspended-growth nitrification process (Table 3). Lagoon liquid was nitrified in an aerated batch reactor containing nitrifying sludge (or free nitrifying bacteria as opposed to immobilized bacteria used in all other examples). The sludge was acclimated to high ammonia concentration (Vanotti and Hunt, 2000, supra), which may inhibit nitrification. Concentration of nitrifying bacteria in the filled reactor was about 4725 mg Mixed Liquor Volatile Suspended Solids (MLVSS)/L and nitrification rate was about 95 mg N/L-reactor/day, which is about three times slower than rates obtained with pellet immobilized bacteria. Alkalinity was monitored during the nitrification treatment and the aeration was terminated when about >90% of the alkalinity was consumed at approximately 40 hours (Table 3). After a settling period of about one hour, to allow the biomass to settle, the nitrified effluent was decanted and transferred to other vessels for the phosphorus precipitation. The nitrification reactor was again filled with lagoon effluent and the react-settle-draw cycle repeated to obtain sufficient nitrified effluent for the phosphorus precipitation step. After transfer to separate vessels, fixed amounts of lime applied at rates of about 148, 296, 445, and 593 mg $Ca(OH)_2$ per liter (about 2,4,6, and 8 mmol Ca/L) were added to the nitrified liquid and mixed with a stirrer for about one minute. All treatments were replicated. Treated wastewater was sampled in the supernatant after about a 0.5 hour sedimentation period and analyzed for nutrients as described above Example 1. The precipitate was filtered with fiberglass filters, dried, weighted and extracted with about IN hydrochloric acid to determine phosphorus recovered in the precipitate.

Phosphorus removal performance was not different from previous data obtained using nitrifiers immobilized in polymer pellets (Lagoon wastewater from a swine operation was treated in a nitrification vessel for about a 16 hour period). The data in Table 3 demonstrate that, independently of the nitrification process used, once ammonia and carbonate alkalinity concentrations are reduced with a nitrification pre-treatment, the subsequent addition of $Ca(OH)_2$ (e.g., lime) rapidly increases the pH of the liquid, thereby promoting formation of calcium phosphate. Another advantage of the process is the remarkable clarity of the treated effluent. As can be seen in Table 3, the concentration of suspended solids in the lagoon liquid is significantly reduced. The low suspended solids content in the treated effluent is important to be able to use subsurface or surface irrigation systems for land application of the effluents.

TABLE 3

Phosphorus removal and recovery from swine wastewater using nitrification pre-treatment with free-nitrifiers and lime precipitation.*

| Ca(OH)$_2$ Applied mmol/L | mg/L | pH | Alkalinity | Suspended Solids | NH$_4$—N | NO$_3$—N | Total P | P Removal[†] % | P Recovery[‡] % |
|---|---|---|---|---|---|---|---|---|---|
|   |   |   |   | mg/L |   |   |   |   |   |
| Influent (Lagoon liquid) | | | | | | | | | |
| 0 | 0 | 7.9(0.2)[¶] | 1251(26) | 180(7) | 212(1) | 0(0) | 62.9(4.1) | — | — |
| Effluent after Nitrification Pre-treatment (Using nitrifying sludge) | | | | | | | | | |
| 0 | 0 | 6.5(0.1) | 115(13) | 118(10) | 55(1) | 158(4) | 63.5(3.4) | 0 | — |
| Effluent after Phosphorus Precipitation | | | | | | | | | |
| 2 | 148 | 8.0(0.1) | — | 78(5) | 52(2) | 162(2) | 30.0(2.3) | 52 | 88 |
| 4 | 296 | 9.2(0.0) | — | 63(10) | 42(2) | 163(4) | 4.0(4.0) | 94 | 100 |
| 6 | 445 | 10.2(0.1) | — | 70(3) | 35(2) | 161(4) | 0.0(0.0) | 100 | 100 |
| 8 | 593 | 10.9(0.1) | — | 70(9) | 33(2) | 162(7) | 0.0(0.0) | 100 | 100 |

*Lagoon liquid was nitrified in an aerated reactor containing nitrifying sludge (or free nitrifying bacteria as oppose to polymer immobilized bacteria used in all other experiments). Concentration of nitrifying bacteria in the reactor was 4725 mg MLVSS/L (Mixed liquor volatile suspended solids). Nitrification rate was 95 mg N/L-reactor/day that is about three times slower than rates obtained with pellet immobilized bacteria. Nevertheless, the data demonstrate that, independently of the nitrification pretreatment procedure, once ammonia and carbonate alkalinity concentrations are substantially reduced with a nitrification pre-treatment, addition of lime rapidly increases the pH of the liquid promoting formation of calcium phosphate, which is the object of the present invention.
[†]Phosphorus removal from liquid fraction relative to influent lagoon concentration.
[‡]Phosphorus Recovery = Percent ratio of P recovered in precipitate and P removed from liquid by process.
[¶]Data are the average of two replicates. Values in parenthesis are standard errors.

EXAMPLE 6

A system was evaluated in a swine operation. The system consisted of a nitrification reactor (Vanotti et al., Nitrifying high-strength wastewater, Industrial Wastewater, Sep./Oct.:30–36, 2000), a 100 gallon tank with a conical bottom, and a mixer to precipitate the phosphorus from the nitrified effluent (P-reactor), a smaller 30 gallon tank to prepare (mix) the chemical with water, a pump to inject the chemical solution into the P-reactor, and a pH controller. Hydrated lime (2% Ca(OH)$_2$ in water) was injected into the stirred tank containing nitrified lagoon wastewater; a pH controller stopped injection when pH of mixed liquid reached a set point of about 9, 9.5, 10, or 10.5 (Treatments 1–4, respectively). Once the desired treatment pH was reached, the precipitated solids were removed from the bottom of the tank after about a 30 minute settling period. The precipitated solids were analyzed for phosphorus content after filtration and drying. A total of about 20 batch runs were conducted consisting of a total of four pH treatment levels and four replicates. The results are shown below in Table 4 (water quality characteristics before and after treatment) and Table 5 (phosphorus recovered in solids); the results indicated that the performance of the system obtained under field conditions was consistent with results obtained in the laboratory (i.e., Example 3). The data also show that the N:P concentration ratio of the effluent can be effectively varied in a range that could match crop requirements (abut 5–15) to high levels (about >15) useful to remediate phosphorus contaminated soils.

TABLE 4

Performance of field proto-type used to remove and recover phosphorus from swine wastewater. Duplin Co. lagoon, 1999.

| Treatment* | pH | Ca(OH)$_2$ Applied | Alkalinity | Suspended Solids | NH$_4$—N | Total N | Total P | N:P Ratio[†] | Ca:P Molar Ratio[‡] |
|---|---|---|---|---|---|---|---|---|---|
|   |   |   |   | mg/L |   |   |   |   |   |
| Influent (Lagoon liquid) | | | | | | | | | |
|   | 7.7 | — | 1738(90)[¶] | 327(41) | 278(4) | 320(9) | 71.9(4.7) | 4.45 | — |
| Treated Effluent with nitrification-Ca extraction process | | | | | | | | | |
| 1 | 9.0 | 141(5) | 511(20) | 83(8) | 8(4) | 303(14) | 25.5(2.8) | 11.9 | 0.82 |
| 2 | 9.5 | 271(28) | 570(41) | 94(7) | 8(4) | 301(14) | 11.1(0.2) | 27.1 | 1.58 |
| 3 | 10.0 | 344(2) | 557(42) | 85(5) | 6(3) | 299(15) | 3.3(0.9) | 90.6 | 2.00 |
| 4 | 10.5 | 433(14) | 545(22) | 89(13) | 5(3) | 299(15) | 1.6(0.7) | 186.9 | 2.52 |

*Treatment: Hydrated lime (2% Ca(OH)$_2$ in water) was injected into a stirred tank containing nitrified lagoon wastewater; a pH controller stopped injection when pH of mixed liquid reached a set point of 9, 9.5, 10, or 10.5 (treatments 1 through 4, respectively). Once the desired treatment pH was reached, the precipitated solids were removed from the bottom of the tank after a 30 minutes settling period. The precipitated solids were filtered with a glass filter, dried and analyzed for phosphorus content (Table 3).
[†]N:P ratio = Total N concentration:Total P concentration. Total N of treated effluent is mostly nitrate-N.
[‡]Ca:P molar ratio = Applied Ca:P in the influent.
[¶]Data are the average of four batch runs. Values in parenthesis are standard errors.

TABLE 5

Phosphorus content in solids produced from swine lagoon liquid using our invented method. Duplin Co. farm, 1999.

| Treatment pH | Dewatered Solids Produced Per $m^3$ of Liquid Treated (g) | Phosphorus Grade (% $P_2O_5$) | Total P Recovered in the Precipitate (g) | P Recovery* (%) |
|---|---|---|---|---|
| 9.0  | 560 | 17.5 | 43.0 | 93 |
| 9.5  | 750 | 17.2 | 56.6 | 93 |
| 10.0 | 910 | 16.1 | 64.0 | 93 |
| 10.5 | 970 | 15.7 | 66.4 | 94 |

*P Recovery = Percent ratio of total P recovered in precipitate and total P removed from liquid by nitrification - lime precipitation process. Water quality characteristics of clarified effluent shown in Table 2.

EXAMPLE 7

To show that the process and system of the present invention works in a predictable way regardless of the source of wastewater source, wastewater was collected from nine swine lagoons in pork producing counties. The sampled lagoons included most types of hog production facilities such as breeding, nursery, and finishing operations. The performance of the system of the invention using a pre-nitrification step was compared to applying the same amount of chemical to a lagoon liquid without using the pre-nitrification step. Phosphorus removal performance in all these experiments is summarized in Table 6. The data indicate that the pre-nitrification step greatly reduced the amount of chemical needed for the formation of calcium phosphate and effective phosphorus precipitation and removal, and that the unique advantages of the system were significant to most confined animal operations.

The foregoing detailed description is for the purpose of illustration. Such detail is solely for that purpose and those skilled in the art can make variations therein without departing from the spirit and scope of the invention.

What is claimed is:

1. A process comprising:
   (a) providing wastewater having at least reduced levels of carbonate and ammonium buffers, and at least reduced levels of suspended solids to a reactor vessel, and
   (b) adding an alkaline earth base to said wastewater to precipitate soluble phosphate.

2. The process of claim 1 wherein said alkaline earth base is selected from the group consisting of calcium hydroxide, magnesium hydroxide, calcium oxide, magnesium oxide, and mixtures thereof.

3. A process comprising:
   (a) providing a nitrified wastewater having at least reduced levels of suspended solids to a reactor vessel,
   (b) adding an alkali to said nitrified wastewater to increase pH of said nitrified wastewater to at least about pH 9, and
   (c) adding a metallic-containing salt or hydroxide to said wastewater having a pH of at least about pH 9 to precipitate phosphate.

4. The process of claim 1 further comprising recovering said phosphate.

5. The process of claim 3 wherein said metallic-containing salt or hydroxide is an alkaline earth metal-containing salt or hydroxide.

6. A process comprising:
   (a) providing nitrified wastewater to a reactor vessel,
   (b) adding an alkali to said nitrified wastewater to increase pH of said nitrified wastewater to at least about pH 9, and
   (c) adding a metallic-containing salt or hydroxide which is an alkaline earth metal-containing salt or hydroxide

TABLE 6

Removal of phosphorus from various North Carolina swine lagoons using hydrated lime with and without a nitrification pre-treatment.

| | Swine Lagoon | | Initial | | Calcium Application Rate (mmol/L)* | | | | | |
|---|---|---|---|---|---|---|---|---|---|---|
| Farm i.d. | Location | Operation Type | Total P Concentration mg P/L | Nitrification Pretreatment | 2 | 4 | 6 | 8 | 10 | 12 |
| | | | | | | | % P Removal | | | |
| 1 | Duplin Co.  | Nursery   | 60.9 | Yes | 25 | 56 | 77 | 92 | 100 | 100 |
|   |             |           |      | No  | 14 | —  | —  | —  | 23  | —   |
| 2 | Duplin Co.  | Finishing | 79.1 | Yes | 3  | 41 | 83 | 94 | 97  | 100 |
|   |             |           |      | No  | 11 | 14 | 43 | 51 | 56  | 78  |
| 3 | Sampson Co. | Finishing | 61.0 | Yes | 36 | 76 | 80 | 100| 100 | 100 |
|   |             |           |      | No  | 1  | 3  | 7  | 16 | 24  | 17  |
| 4 | Duplin Co.  | Finishing | 85.2 | Yes | 22 | 61 | 89 | 99 | 100 | 100 |
|   |             |           |      | No  | 1  | 9  | 14 | 13 | 20  | 19  |
| 5 | Onslow Co.  | Finishing | 26.0 | Yes | 61 | 86 | 93 | 100| 100 | 100 |
|   |             |           |      | No  | 27 | 41 | 55 | 77 | 83  | 89  |
| 6 | Onslow Co.  | Breeding  | 40.1 | Yes | 69 | 69 | 86 | 94 | 100 | 100 |
|   |             |           |      | No  | 4  | 38 | 58 | 72 | 73  | 75  |
| 7 | Onslow Co.  | Finishing | 65.4 | Yes | 22 | 63 | 88 | 89 | 90  | 100 |
|   |             |           |      | No  | 7  | 9  | 16 | 20 | 19  | 24  |
| 8 | Onslow Co.  | Nursery   | 61.7 | Yes | 22 | 55 | 73 | 85 | 86  | 92  |
|   |             |           |      | No  | 4  | 10 | 23 | 20 | 29  | 29  |
| 9 | Wake Co.    | Research  | 59.7 | Yes | 42 | 63 | 72 | 93 | 98  | 100 |
|   |             |           |      | No  | 27 | 44 | 57 | 67 | 68  | 66  |

*Calcium applied as $Ca(OH)_2$; 1 mmol = 74.09 mg $Ca(OH)_2$.

selected from the group consisting of calcium, magnesium, and mixtures thereof.

7. A process comprising:
   (a) providing nitrified wastewater to a reactor vessel,
   (b) adding an alkali to said nitrified wastewater to increase pH of said nitrified wastewater to at least about pH 9, and
   (c) adding a metallic containing salt or hydroxide selected from the group consisting of sodium, potassium, and mixtures thereof to said wastewater having a pH of at least about 9 to precipitate phosphate.

8. A process for removing soluble phosphorus from animal wastewater comprising:
   (a) providing wastewater to a nitrification reactor vessel to produce a clarified nitrified wastewater,
   (b) flowing said nitrified wastewater to a separate reactor vessel and adding alkali to said nitrified wastewater to increase the pH of said nitrified wastewater to at least pH 9, and
   (c) adding calcium or magnesium salts or hydroxide to precipitate soluble phosphorus to produce an effluent with a predefined nitrogen:phosphorus ratio.

9. The process of claim 8 wherein alkali and calcium or magnesium salts or hydroxide are added at rates to produce an effluent having a nitrogen:phosphorus ratio which meets the needs of a specific crop.

10. The process of claim 8 wherein alkali and calcium or magnesium salts or hydroxides are added at rates to produce an effluent having a nitrogen:phosphorus ratio to remediate phosphorus contaminated spray fields.

11. The process of claim 8 comprising using said effluent for surface or subsurface irrigation.

12. A process for removing soluble phosphorus from animal wastewater comprising:
   (a) providing wastewater to a nitrification reactor vessel to produce nitrified wastewater,
   (b) flowing said nitrified wastewater to a separate reactor vessel and adding alkali to said nitrified wastewater to increase the pH of said nitrified wastewater to at least about pH 9,
   (c) adding calcium or magnesium salts to precipitate soluble phosphorus to produce an effluent with a predefined nitrogen:phosphorus ratio, and
   (d) using said effluent in a constructed wetland to facilitate denitrification of said effluent.

13. A process for at least reducing the presence of infectious microorganisms in wastewater comprising:
   (a) providing wastewater to a nitrification reactor vessel to produce clarified, nitrified wastewater, and
   (b) flowing said nitrified wastewater to a separate reactor vessel and adding alkali to said nitrified wastewater to increase the pH of said nitrified wastewater to at least pH 9 and at least reducing the presence of infectious microorganisms.

14. The process of claim 13 further comprising adding calcium or magnesium salts or hydroxide to precipitate soluble phosphorus to produce an effluent with a predefined nitrogen:phosphorus ratio and at least reduce levels of infectious microorganisms.

15. A process for at least reducing the presence of infectious microorganisms in wastewater comprising:
   (a) providing wastewater to a nitrification reactor vessel to produce nitrified wastewater,
   (b) flowing said nitrified wastewater to a separate reactor vessel and adding alkali to said nitrified wastewater to increase the pH of said nitrified wastewater to at least pH 9 and at least reducing the presence of infectious microorganisms,
   (c) adding calcium or magnesium salts or hydroxide to precipitate soluble phosphorus to produce an effluent with a predefined nitrogen:phosphorus ratio and at least reduce levels of infectious microorganisms, and
   (d) flowing said effluent into a constructed wetland.

16. A process for at least reducing the presence of infectious microorganisms in wastewater comprising:
   (a) providing wastewater to a nitrification reactor vessel to produce clarified, nitrified wastewater, and
   (b) flowing said nitrified wastewater to a separate reactor vessel and adding alkali to said nitrified wastewater to increase the pH of said nitrified wastewater to at least pH 9 and at least reducing the presence of infectious microorganisms selected from the group consisting of enteropathogenic bacteria, picarnovirus, and mixtures thereof.

17. A system for wastewater treatment comprising:
   (a) a primary settling unit,
   (b) an aeration unit in fluid communication with said primary settling unit,
   (c) a nitrification bioreactor unit in fluid communication with said aeration unit, and
   (d) a phosphorus separation unit in fluid communication with said nitrification bioreactor unit.

18. The system of claim 17 further comprising a sedimentation unit in fluid communication with said aeration unit and said nitrification bioreactor unit.

19. The system of claim of claim 17 wherein said primary settling unit is a lagoon.

20. A system for wastewater treatment comprising:
   (a) a solid separation unit,
   (b) an aeration unit in direct fluid communication with a clarified effluent of said solid separation unit,
   (c) a nitrification bioreactor in direct fluid communication with said aeration unit, and
   (d) a phosphorus separation reactor unit in fluid communication with a liquid effluent from said nitrification bioreactor.

21. The system of claim 20 wherein flocculants are used in said solid separation unit to clump suspended solids and increase separation efficiency of said separation unit.

22. The system of claim 20 further comprising a sedimentation unit in fluid communication with said aeration unit and said nitrification bioreactor unit.

23. A system for wastewater treatment comprising:
   (a) a solid separation unit,
   (b) a denitrification unit in direct fluid communication with a clarified effluent from said solid separation unit,
   (c) a nitrification unit in fluid communication with said denitrification unit, and
   (d) a phosphorus separation reactor unit in fluid communication with a liquid effluent from said nitrification unit.

24. The system of claim 23 further comprising a clarification unit in fluid communication with said nitrification unit and said phosphorus separation unit.

25. The system of claim 23 wherein flocculants are used in said separation unit to clump suspended solids and increase separation efficiency of said separation unit.

* * * * *